United States Patent
Hu et al.

(10) Patent No.: US 11,051,017 B2
(45) Date of Patent: Jun. 29, 2021

(54) ADAPTIVE LOOP FILTER (ALF) INDEX SIGNALING

(71) Applicant: QUALCOMM Incorporated, San Diego, CA (US)

(72) Inventors: Nan Hu, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/717,530

(22) Filed: Dec. 17, 2019

(65) Prior Publication Data

US 2020/0204800 A1 Jun. 25, 2020

Related U.S. Application Data

(60) Provisional application No. 62/783,090, filed on Dec. 20, 2018.

(51) Int. Cl.
| | |
|---|---|
| *H04N 19/117* | (2014.01) |
| *H04N 19/82* | (2014.01) |
| *H04N 19/176* | (2014.01) |
| *H04N 19/132* | (2014.01) |

(Continued)

(52) U.S. Cl.
CPC ......... *H04N 19/117* (2014.11); *H04N 19/105* (2014.11); *H04N 19/132* (2014.11); *H04N 19/176* (2014.11); *H04N 19/423* (2014.11); *H04N 19/82* (2014.11)

(58) Field of Classification Search
CPC .... H04N 19/117; H04N 19/82; H04N 19/423; H04N 19/176; H04N 19/105; H04N 19/132
See application file for complete search history.

(56) References Cited

U.S. PATENT DOCUMENTS

| | | | |
|---|---|---|---|
| 9,813,738 | B2 | 11/2017 | Tsai et al. |
| 9,819,966 | B2 | 11/2017 | Chong et al. |
| 9,872,015 | B2 | 1/2018 | Fu et al. |

(Continued)

FOREIGN PATENT DOCUMENTS

| | | |
|---|---|---|
| EP | 0340041 A2 | 11/1989 |
| WO | 2018122092 A1 | 7/2018 |

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

(Continued)

*Primary Examiner* — Joseph W Becker
(74) *Attorney, Agent, or Firm* — Espartaco Diaz Hidalgo

(57) ABSTRACT

Techniques are described for performing adaptive loop filtering in video coding. A video coder is configured to determine available adaptive loop filter (ALF) sets and at least one of signal information indicative of a size of a list of ALF sets or receive information indicative of the size of the list of ALF sets. The video coder is configured to construct the list of ALF sets based on the indicated size of the list of ALF sets, determine an ALF set for the current block based on the constructed list of ALF sets, and perform adaptive loop filtering based on the determined ALF set.

26 Claims, 9 Drawing Sheets

(51) Int. Cl.
  *H04N 19/423* (2014.01)
  *H04N 19/105* (2014.01)

(56) References Cited

U.S. PATENT DOCUMENTS

| | | | |
|---|---|---|---|
| 9,877,023 | B2 | 1/2018 | Chong et al. |
| 10,057,574 | B2 | 8/2018 | Li et al. |
| 10,506,230 | B2 | 12/2019 | Zhang et al. |
| 2012/0039383 | A1 | 2/2012 | Huang et al. |
| 2012/0269264 | A1 | 10/2012 | Sato |
| 2012/0294353 | A1 | 11/2012 | Fu et al. |
| 2013/0022104 | A1 | 1/2013 | Chen et al. |
| 2013/0114694 | A1 | 5/2013 | Chen et al. |
| 2013/0194384 | A1 | 8/2013 | Hannuksela |
| 2013/0243104 | A1 | 9/2013 | Chen et al. |
| 2014/0092978 | A1 | 4/2014 | Bugdayci et al. |
| 2015/0382018 | A1 | 12/2015 | Hendry et al. |
| 2016/0234492 | A1 | 8/2016 | Li et al. |
| 2018/0192050 | A1 | 7/2018 | Zhang et al. |
| 2019/0166370 | A1* | 5/2019 | Xiu .................. H04N 19/176 |
| 2019/0373258 | A1 | 12/2019 | Karczewicz et al. |
| 2020/0068196 | A1 | 2/2020 | Zhang et al. |
| 2020/0084444 | A1 | 3/2020 | Egilmez et al. |
| 2020/0145648 | A1 | 5/2020 | Lee |
| 2020/0213619 | A1 | 7/2020 | Aono et al. |

OTHER PUBLICATIONS

Bross B., et al., "High Efficiency Video Coding (HEVC) Text Specification Draft 10 (for FDIS & Last Call)," Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, JCTVC-L1003-v34, 263 pp.

Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v1, 40 pages.

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 2019, JVET-N1001-v3, 371 pages.

Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.

Bross B., et al., "Versatile Video Coding (Draft 7)", Joint Video Experts Team (JVET) of ITU-T SG 16 WP 3 and ISO/IEC JTC 1/SC 29/WG 11, JVET-P2001-v9, 16th Meeting: Geneva, CH, Oct. 1-11, 2019, 490 pages.

Bross B., et al., "Versatile Video Coding (Draft 7)", Joint Video Experts Team (JVET) of ITU-T SG 16 WP 3 and ISO/IEC JTC 1/SC 29/WG 11, JVET-P2001-vE, 16th Meeting: Geneva, CH, Oct. 1-11, 2019, 488 pages.

Chen J., et al., "Algorithm description for Versatile Video Coding and Test Model 1 (VTM 1)", Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-v1, 7 pages.

Chen J., et al., "Algorithm Description for Versatile Video Coding and Test Model 5 (VTM 5)", 14th JVET Meeting; Mar. 19, 2019-Mar. 27, 2019; Geneva; (The Joint Video Exploration Team of ISO/IEC JTC1/SC29/WG11 and ITU-T SG.16), No. JVET-N1002, May 21, 2019, XP030205194, Retrieved from the Internet: URL:http://phenix.int-evry.fr/jvet/doc_end_user/documents/14_Geneva/wg11/JVET-N1002-v1.zip JVET-N1002-v1.docx, 70 pages.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.

Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/,, No. JVET-A1001 Feb. 24, 2016 (Feb. 24, 2016), XP030150000, 27 pages.

Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.

Chen J., et al., "Coding Tools Investigation for Next Generation Video Coding", ITU-T SG 16, Contribution 806, COM16-C806-E, Draft, Study Period 2013-2016, International Telecommunication Union, Geneva, CH, vol. 6/16, Jan. 27, 2015 (Jan. 27, 2017), XP044083237, pp. 1-7. [Retrieved on Jan. 27, 2015].

De La Rocha Gomes-Arevalillo A., "Investigating the Adaptive Loop Filter in Next Generation Video Coding", Independent thesis Advanced level (degree of Master (Two Years)), Feb. 8, 2017 (Feb. 8, 2017), XP055509944, 75 pages, Retrieved from the Internet:URL: http://www.diva-portal.orgjsmashiget/diva2:1072638/FULLTEXT01.pdf [retrieved on Sep. 26, 2018].

Ergen S., "ZigBee/IEEE 802.15.4 Summary", Sep. 10, 2004, 37 Pages.

Fu C-M., et al., "Sample Adaptive Offset in the HEVC Standard", IEEE Transactions on Circuits and Systems for Video Technology, Institute of Electrical and Electronics Engineers, USA, Dec. 1, 2012, vol. 22, No. 12, pp. 1755-1764, XP011487153, ISSN: 1051-8215, DOI:10.1109/TCSVT.2012.2221529.

Hu N., et al., "CE5: Coding Tree Block based Adaptive Loop Filter (CE5-4)", Joint Video Experts Team (JVET) of ITU-T SG 16 WP 3 and ISO/IEC JTC 1/SC 29/WG 11, JVET-N0415, 14th Meeting: Geneva, CH, Mar. 19-27, 2019, pp. 1-6.

Hu N., et al., "CE5: Coding Tree Block based Adaptive Loop Filter (CE5-4)", Joint Video Experts Team (JVET) of ITU-T SG 16 WP 3 and ISO/IEC JTC 1/SC 29/WG 11, JVET-N0415-v2, 14th Meeting: Geneva, CH, Mar. 19-27, 2019, 16 pages.

Hu N., et al., "Coding Tree Block based Adaptive Loop Filter", Joint Video Experts Team (JVET) of ITU-T SG 16 WP 3 and ISO/IEC JTC 1/SC 29/WG 11, JVET-M0429, 13th Meeting: Marrakech, MA, Jan. 9-18, 2019, pp. 1-12.

Hu (Qualcomm) N, et al., "CE2.3 and CE2.4: Fixed Filters, Temporal Filters, CU-Level Control and Low-Latency Encoder for ALF", 12. JVET Meeting, Oct. 3, 2018-Oct. 12, 2008, Macao, (The Joint Video Exploration Team of ISO/IEC JTC1/SC29/WG11 and ITU-T SG. 16), No. JVET-L0391, Oct. 1, 2018 (Oct. 1, 2018), 37 Pages, XP030194208, Retrieved from the Internet: URL: http://phenix.int-evry.fr/jvet/doc_end_user/documents/12_Macao/wg11/JVET-L0391-v2.zip JVET-L0391-v2_docx [retrieved on Oct. 1, 2018] section 2.1.2.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

International Search Report and Written Opinion—PCT/US2019/067220—ISA/EPO—dated Mar. 18, 2020.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.265, "Series H: Audiovisual and Multimedia Systems, Infrastructure of audiovisual services—Coding of moving video, High efficiency video coding," The International Telecommunication Union. Dec. 2016, 664 Pages.

Karczewicz M., et al., "EE2.5: Improvements on Adaptive Loop Filter," Joint Video Exploration Team (JVET) of ITU-T SG 16 WP 3 and ISO/IEC JTC 1/SC 29/WG 11, Document: JVET-00038, 3rd Meeting: Geneva, CH, May 26-Jun. 1, 2016, 4 pages.

(56) References Cited

OTHER PUBLICATIONS

Karczewicz M., et al., "Geometry Transformation-based Adaptive In-Loop Filter," Picture Coding Symposium, IEEE, Dec. 4-7, 2016, pp. 1-5, XP033086856, DOI: 10.1109/PCS.2016.7906346, [retrieved on Apr. 19, 2019], Section III.
Karczewicz M., et al., "Improvements on Adaptive Loop Filter," Joint Video Exploration Team (JVET) of ITU-T SG 16 WP 3 and ISO/IEC JTC 1/SC 29/WG 11, Document: JVET-B0060-v2, 2nd Meeting: San Diego, USA, Feb. 20-26, 2016, XP030150068, URL: http://PHENIX.INT-EVRY.FR/JVET/ ., No. JVET-B0060, 6 pages.
Norkin A., et al., "HEVC Deblocking Filter", IEEE Transactions on Circuits and Systems for Video Technology, Dec. 1, 2012 (Dec. 1, 2012), vol. 22, No. 9, pp. 1746-1754, XP011487156.
Office Action dated Mar. 23, 2020 from U.S. Appl. No. 16/427,017, filed May 30, 2019, 12 Pages.
Tsai C-Y., et al., "Adaptive Loop Filtering for Video Coding," IEEE Journal of Selected Topics in Signal Processing, vol. 7 (6), Dec. 1, 2013, pp. 934-945, XP055265962, US ISSN: 1932-4553, DOI: 10.1109/JSTSP.2013.2271974, the whole document.
Wang Y-K., et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.
Wiegand T., et al., "WD3: Working Draft 3 of High-Efficiency Video Coding," Document JCTVC-E603, 5th Meeting: Geneva, CH, Mar. 16-23, 2011, 293 pages.
Zhang, et al., "ALF Temporal Prediction with Temporal Scalability," Joint Video Exploration Team (JVET) of ITU-T SG 16 WP 3 and ISO/IEC JTC 1/SC 29/WG 11, Document No. JVET-E0104, 5th Meeting; Geneva, CH, Jan. 12-20, 2017, last updated Jan. 14, 2017, 4 Pages.
Non-Final Office Action from U.S. Appl. No. 16/427,017 dated Jul. 13, 2020, (11 pp).
Non-Final Office Action from U.S. Appl. No. 16/567,966 dated Aug. 5, 2020, (25 pp).

* cited by examiner

| Alf (P₁, tid₁) | Alf (P₂, tid₂) | Alf (P₃, tid₃) | ... | Alf (Pₙ, tidₙ) |

FIG. 4

ADAPTIVE LOOP FILTER (ALF) INDEX SIGNALING

This application claims the benefit of U.S. Provisional Application No. 62/783,090, filed Dec. 20, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for adaptive loop filtering (ALF) in video coding. The techniques of this disclosure may be used with a variety of coding techniques or be an efficient coding tool in any future video coding standards, such as H.266/VVC (Versatile Video Coding).

In some examples, ALF sets (also called ALF coefficients) used when filtering a previous block may be used as a predictor for the ALF set for filtering a current block. The prediction of ALF sets for a current block based on ALF sets of a previous block is referred to as temporal prediction for ALF. This disclosure describes example practical applications to utilize ALF sets of a previous block, slice, or picture in a way to ensure that there is not a mismatch in the ALF sets available to a video encoder and a video decoder.

In one example, the disclosure describes a method of filtering video data, the method comprising determining available adaptive loop filter (ALF) sets stored in a buffer that can be utilized for performing adaptive loop filtering on a current block of a current picture, wherein the ALF sets include ALF sets of previously coded blocks, and wherein the available ALF sets comprise ALF sets having a temporal layer identification value that is less than or equal to a temporal layer identification value of the current block, receiving information indicative of a size of a list of ALF sets, constructing the list of ALF sets from the determined available ALF sets based on the indicated size of the list of ALF sets, determining an ALF set for the current block based on the constructed list of ALF sets, and performing adaptive loop filtering on the current block based on the determined ALF set.

In one example, the disclosure describes a device for filtering video data, the device comprising a buffer configured to store adaptive loop filter (ALF) sets of previously coded blocks and processing circuitry configured to determine available ALF sets stored in the buffer that can be utilized for performing adaptive loop filtering on the current block of the current picture, wherein the available ALF sets comprise ALF sets having a temporal layer identification value that is less than or equal to a temporal layer identification value of the current block, receive information indicative of a size of a list of ALF sets, construct the list of ALF sets from the determined available ALF sets based on the indicated size of the list of ALF sets, determine an ALF set for the current block based on the constructed list of ALF sets, and perform adaptive loop filtering on the current block based on the determined ALF set.

In one example, the disclosure describes a method of filtering video data, the method comprising determining available adaptive loop filter (ALF) sets stored in a buffer that can be utilized for performing adaptive loop filtering on a current block of a current picture, wherein the ALF sets include ALF sets of previously coded blocks, and wherein the available ALF sets comprise ALF sets having a temporal layer identification value that is less than or equal to a temporal layer identification value of the current block, signaling information indicative of a size of a list of ALF sets, constructing the list of ALF sets from the determined available ALF sets based on the indicated size of the list of ALF sets, determining an ALF set for the current block based on the constructed list of ALF sets, and performing adaptive loop filtering on the current block based on the determined ALF set.

In one example, the disclosure describes a device for filtering video data, the device comprising a buffer configured to store adaptive loop filter (ALF) sets of previously coded blocks and processing circuitry configured to determine available ALF sets stored in the buffer that can be utilized for performing adaptive loop filtering on the current block of the current picture, wherein the available ALF sets comprise ALF sets having a temporal layer identification value that is less than or equal to a temporal layer identification value of the current block, signal information indicative of a size of a list of ALF sets, construct the list of ALF sets from the determined available ALF sets based on the indicated size of the list of ALF sets, determine an ALF set for the current block based on the constructed list of ALF sets, and perform adaptive loop filtering on the current block based on the determined ALF set.

In one example, the disclosure describes a non-transitory computer-readable storage medium storing instructions thereon that when executed cause one or more processors to determine available adaptive loop filter (ALF) sets stored in a buffer that can be utilized for performing adaptive loop filtering on a current block of a current picture, wherein the ALF sets include ALF sets of previously coded blocks, and wherein the available ALF sets comprise ALF sets having a temporal layer identification value that is less than or equal to a temporal layer identification value of the current block, receive information indicative of a size of a list of ALF sets, construct the list of ALF sets from the determined available ALF sets based on the indicated size of the list of ALF sets, determine an ALF set for the current block based on the constructed list of ALF sets, and perform adaptive loop filtering on the current block based on the determined ALF set.

In one example, the disclosure describes a non-transitory computer-readable storage medium storing instructions thereon that when executed cause one or more processors to determine available adaptive loop filter (ALF) sets stored in a buffer that can be utilized for performing adaptive loop filtering on a current block of a current picture, wherein the ALF sets include ALF sets of previously coded blocks, and wherein the available ALF sets comprise ALF sets having a temporal layer identification value that is less than or equal to a temporal layer identification value of the current block, signal information indicative of a size of a list of ALF sets, construct the list of ALF sets from the determined available ALF sets based on the indicated size of the list of ALF sets, determine an ALF set for the current block based on the constructed list of ALF sets, and perform adaptive loop filtering on the current block based on the determined ALF set.

In one example, the disclosure describes a device for filtering video data, the device comprising means for determining available adaptive loop filter (ALF) sets stored in a buffer that can be utilized for performing adaptive loop filtering on a current block of a current picture, wherein the ALF sets include ALF sets of previously coded blocks, and wherein the available ALF sets comprise ALF sets having a temporal layer identification value that is less than or equal to a temporal layer identification value of the current block, means for receiving information indicative of a size of a list of ALF sets, means for constructing the list of ALF sets from the determined available ALF sets based on the indicated size of the list of ALF sets, means for determining an ALF set for the current block based on the constructed list of ALF sets, and means for performing adaptive loop filtering on the current block based on the determined ALF set.

In one example, the disclosure describes a device for filtering video data, the device comprising means for determining available adaptive loop filter (ALF) sets stored in a buffer that can be utilized for performing adaptive loop filtering on a current block of a current picture, wherein the ALF sets include ALF sets of previously coded blocks, and wherein the available ALF sets comprise ALF sets having a temporal layer identification value that is less than or equal to a temporal layer identification value of the current block, means for signaling information indicative of a size of a list of ALF sets, means for constructing the list of ALF sets from the determined available ALF sets based on the indicated size of the list of ALF sets, means for determining an ALF set for the current block based on the constructed list of ALF sets, and means for performing adaptive loop filtering on the current block based on the determined ALF set.

The details of one or more examples are set forth in the accompanying drawings and the description below. Other features, objects, and advantages will be apparent from the description, drawings, and claims.

BRIEF DESCRIPTION OF DRAWINGS

FIG. 4 is a block diagram illustrating an example of memory stores for ALF parameters and temporal layer ID information.

DETAILED DESCRIPTION

Figure 1:
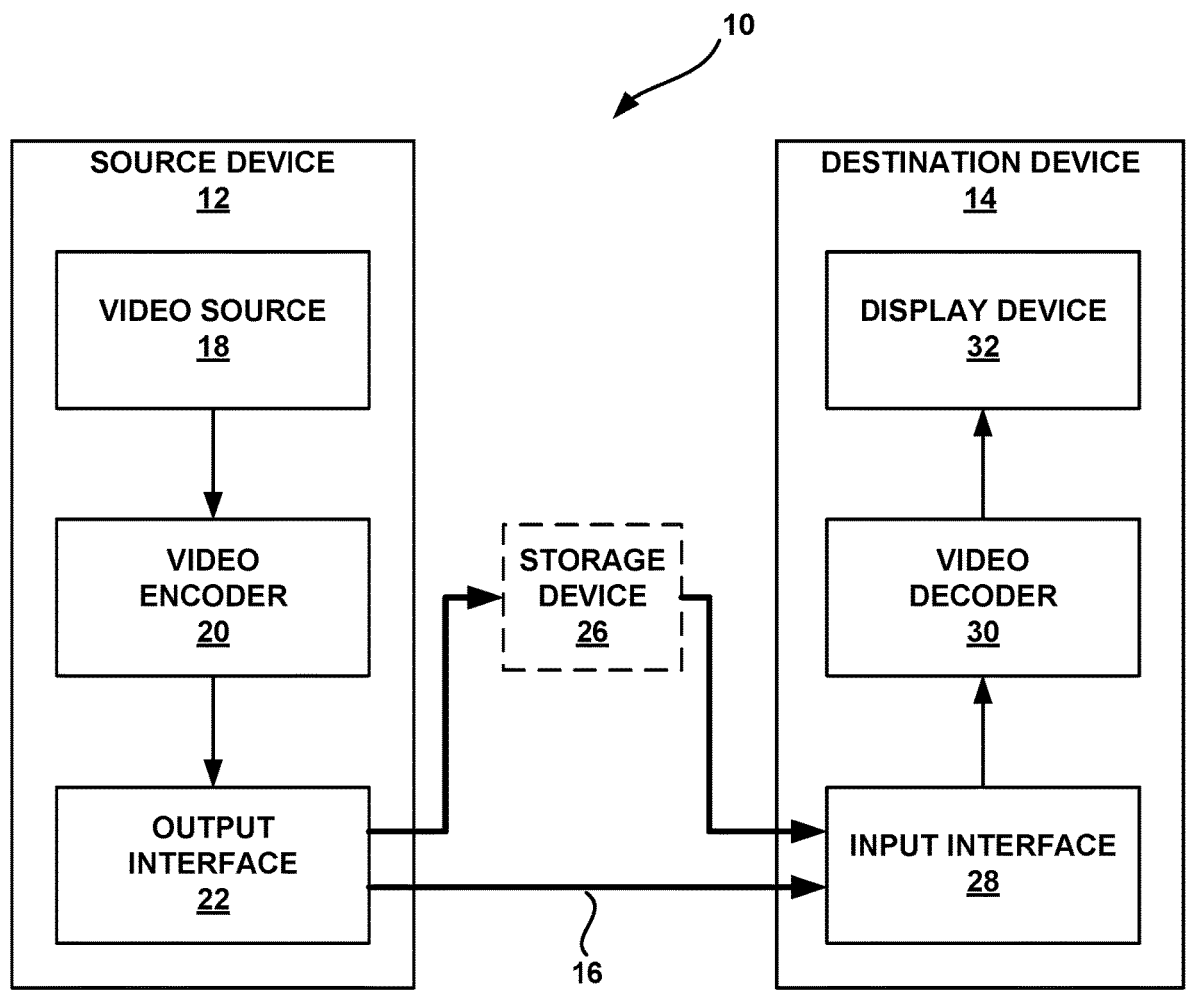
FIG. 1 is a block diagram illustrating an example video encoding and decoding system that may utilize the techniques described in this disclosure.

This disclosure describes techniques related to filtering operations which could be used in a post-processing stage, as part of in-loop coding, or in the prediction stage of video coding. Video coding typically involves predicting a block of video data from either an already coded block of video data in the same picture (i.e. intra prediction) or an already coded block of video data in a different picture (i.e. inter prediction). In some instances, the video encoder also calculates residual data by comparing the predictive block to the original block. Thus, the residual data represents a difference between the predictive block and the original block. The video encoder transforms and quantizes the residual data and signals the transformed and quantized residual data in the encoded bitstream. A video decoder adds the residual data to the predictive block to produce a reconstructed video block that matches the original video block more closely than the predictive block alone.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes techniques related to filtering method(s) referred to as "Adaptive Loop Filter (ALF)." ALF may be used in a post-processing stage or for in-loop coding, or in a prediction process.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, a video encoder typically performs video decoding as part of the processes of determining how to encode video data. For instance, video encoding devices of this disclosure may implement a decoding loop or reconstruction loop.

As described above, to improve quality, the video decoder may apply adaptive loop filtering to filter the reconstructed block and generate a filtered reconstructed block. In some examples, the filtered reconstructed block may be used as a reference block for decoding a subsequent block. In such cases, the adaptive loop filtering may be referred to as in-loop filtering. For in-loop filtering, a video encoder may similarly apply adaptive loop filtering to a reconstructed block, reconstructed by the video encoder, so that the reference block used by the video encoder for encoding a subsequent block is the same as the reference block used by the video decoder for decoding the subsequent block. In some examples, the filtered reconstructed block may not be used as a reference block for decoding the subsequent block. Rather, the unfiltered, reconstructed block may be used as the reference block. In such cases, the adaptive loop filtering may be referred to as post-filtering.

One example way in which to perform ALF is for the video encoder to signal ALF sets (also called ALF coefficients or ALF parameters) to the video decoder. As one example, the video encoder may determine the ALF sets as follows h(k, l), k=−K, . . . , K, l, and may quantize the ALF sets according to f(k,l)=round(normFactor*h(k,l)). In the video decoder, the video decoder may apply filter sets f (k, l) to a reconstructed block R(i, j) as follows:

$$\tilde{R}(i,j) = \sum_{k=-K}^{K}\sum_{l=-K}^{K} f(k,l)R(i+k, j+l) / \sum_{k=-K}^{K}\sum_{l=-K}^{K} f(k,l),$$

where i and j are the coordinates of the pixels within the block.

Signaling of the ALF sets may require additional bandwidth. Accordingly, to reduce the amount of data that needs signaling, ALF sets for a picture, tile of the picture, tile group of the picture, slice of the picture, or block of the picture may be predicted from ALF sets of a previous, picture, slice, tile, tile group, or block. For example, the video encoder and the video decoder may construct a list of ALF sets in a buffer that stores ALF sets for previously coded pictures, slices, or blocks. The video encoder may signal an index into the list of ALF sets, and the video decoder may determine an ALF set for the current block based on the signaled index (e.g., determine one of the ALF sets for the current block based on the constructed list of ALF sets).

Utilizing an ALF set of a previously coded picture, slice, tile, tile group, or block is referred to as temporal prediction for ALF. The ALF set of a previously coded picture, slice, tile, tile group, or block is referred to as a temporal filter set or temporal ALF set. Therefore, the video encoder and the video decoder may each include a buffer that stores temporal filter sets from which the video encoder and the video decoder generate a list of ALF sets (i.e., list of temporal filter sets). For a current block, slice, tile, tile group or picture, the video encoder may determine an ALF set (e.g., temporal set) in the list of ALF sets to use for adaptive loop filtering and signal an index into the list of ALF sets that identifies the determined ALF set. The video decoder receives the index and determines the ALF set to use based on the ALF set identified by the index in the list of ALF sets. The video decoder may use the determined ALF set for ALF.

However, in some cases, such as in hierarchical coding schemes, there may be a possibility of mismatch between the list of ALF sets generated by the video encoder and the video decoder. For instance, the video encoder may store ALF sets in a buffer and the video decoder may store ALF sets in a buffer. In hierarchical coding schemes, the ALF sets stored in the buffer by the video encoder and the ALF sets stored in the buffer by the video decoder may be different.

In hierarchical coding schemes, there are a plurality of layers identified by temporal layer identification values (temporal layer IDs or tIds). In hierarchical coding schemes, based on bandwidth availability or processing capabilities of the video decoder, layers having higher temporal layer IDs may be dropped in the bitstream. For instance, the plurality of layers may include a base layer (e.g., with temporal layer ID of 0) and one or more enhancement layers (e.g., each with temporal layer IDs greater than 0). The base layer should be completely decodable without needing information from any of the other layers. That is, for a base level of image quality, the video decoder may not need to decode any other layers other than the pictures in the base layer.

For enhanced image quality, the video decoder may decode a first enhancement layer (e.g., with temporal layer ID of 1) and the base layer, for further enhanced image quality, the video decoder may decode a second enhancement layer (e.g., with temporal layer ID of 2) and the first enhancement layer and the base layer, and so forth. The above is one example of a hierarchical coding scheme, and the example techniques should not be considered limited to the above example.

Pictures in layers having lower temporal layer IDs cannot use other coded information in layers having higher temporal layer IDs as reference pictures because the pictures in the layers having the higher temporal layer IDs may be dropped from the bitstream including information used to perform ALF on those pictures. Accordingly, to ensure that ALF sets having a higher temporal layer ID is not used for a picture having a lower temporal layer ID, the buffer may also include information indicating the temporal layer ID associated with the ALF set. For instance, if an ALF set is associated with a picture having a temporal layer ID of 1, then the buffer may store the ALF set (e.g., ALF coefficients) and the information that temporal layer ID is 1.

As pictures are encoded or decoded, the video encoder and the video decoder may update respective buffers with new ALF sets (e.g., by overwriting ALF sets already in the buffer). At the video encoder, the buffer may include ALF sets from pictures having different temporal layer IDs, and the video encoder may overwrite the buffer with new ALF sets. However, the video decoder may not have reconstructed the same pictures (e.g., some of the coded information having higher temporal layer IDs may have been dropped in the bitstream due to bandwidth or processing capabilities). Therefore, when the buffer storing the ALF sets is full for the video encoder and an entry in the buffer needs to be overwritten, the video decoder may not overwrite any entry in the buffer.

For instance, the video decoder may only receive video data for decoding pictures with temporal layer ID of 0. The video encoder may encode a picture with temporal layer ID of 1 and update its buffer with the ALF set for the picture with temporal layer ID of 1 as an ALF set to be used as a predictor for an ALF set of a subsequent picture/slice/block. However, the video decoder did not receive the video data for the picture with temporal layer ID of 1. Therefore, the video decoder may not have updated its buffer with the ALF set of the picture with temporal layer ID of 1. Accordingly, in this example, the buffer storing the ALF sets for the video encoder and the video decoder may be different.

Because the buffer of the video encoder and the buffer of the video decoder include different ALF sets, generating the list of ALF sets by the video encoder and by the video decoder may result in different lists of ALF sets. In this way, there may be a mismatch in the list of ALF sets at the video encoder and the video decoder.

In one or more examples, to address the possible mismatch in the list of ALF sets, the video encoder may signal information indicative of a size of the list of ALF sets which may be based on a number of available ALF sets in the buffer that can be utilized for performing adaptive loop filtering on the current block. The video decoder may then determine the list of ALF sets based on the information indicative of the size of the list of ALF sets. In some examples, the size of the list of ALF sets may be equal to the number of available ALF sets in the buffer that can be utilized for performing adaptive loop filtering on the current block. In such examples, by determining the number of available ALF sets in the buffer that can be utilized for performing adaptive loop filtering, the video encoder may determine the size of the list of ALF sets. In some examples, the size of the list of ALF sets may be less than the number of available ALF sets. In such examples, the video encoder may determine the size of the list of ALF sets as a value that is less than the number of available ALF sets.

The video encoder and the video decoder may then construct the list of ALF sets based on the indicated size of the list of ALF sets. By constraining the size of the list of ALF sets based on a size determined and signaled by the video encoder, the example techniques may ensure that the list of ALF sets for both the video encoder and the video decoder match. As an example, assume that the current picture has a temporal layer ID of 1. In this example, the possible ALF sets that can be used should be for pictures having a temporal layer ID of 1 or less than 1. The buffer for the video encoder may store N number of ALF sets associated with pictures having a temporal layer ID of 1 or less than 1, and the buffer for the video decoder may store M number (where M may be different than N) of ALF sets associated with pictures having a temporal layer ID of 1 or less than 1.

In this example, the video encoder may signal that the list of ALF sets is of size of N (e.g., the number of filter sets is N). Although the buffer of the video decoder includes M ALF sets associated with pictures having temporal layer ID of 1 or less than 1, the video decoder may generate a list of ALF sets of size N. The list of ALF sets that the video decoder generates may be the ALF sets for the N most recent picture or ALF sets for N pictures identified by the video encoder.

This way, the list of ALF sets generated by the video encoder and the list of ALF sets generated by the video decoder may the same. The video encoder may signal an index into the list of ALF sets (e.g., by using truncated coding methods). The video decoder may determine the ALF set to use for filtering the current block, slice, or picture based on the index into the list of ALF sets.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may be any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication (i.e., source device 12 and destination device 14 may be wireless communication device(s)).

Destination device 14 may receive the encoded video data to be decoded via a link 16. Link 16 may be any type of medium or device capable of moving the encoded video data from source device 12 to destination device 14. In one example, link 16 may be a communication medium to enable source device 12 to transmit encoded video data directly to destination device 14 in real-time. The encoded video data may be modulated according to a communication standard, such as a wireless communication protocol, and transmitted to destination device 14. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may be any of a variety of display devices such as a liquid crystal display (LCD), a plasma display, an organic light emitting diode (OLED) display, or another type of display device.

Video encoder 20 and video decoder 30 may operate similar or according to a video compression standard, such as the recently finalized High Efficiency Video Coding (HEVC) standard and may operate similar or conform to the HEVC Test Model (HM). Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

Alternatively, video encoder 20 and video decoder 30 may operate similar or according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multiview Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual. HEVC (ITU-T H.265), including its range extension, multiview extension (MV-HEVC) and scalable extension (SHVC), were developed by the Joint Collaboration Team on Video Coding (JCT-VC) as well as the Joint Collaboration Team on 3D Video Coding Extension Development (JCT-3V) of ITU-T Video Coding Experts Group (VCEG) and ISO/IEC Motion Picture Experts Group (MPEG). The finalized HEVC draft, referred to as HEVC WD hereinafter, is available at http://phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are now studying the potential need for standardization of future video coding technology with a compression capability that potentially exceeds that of the current HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area. The JVET first met during 19-21 Oct. 2015. A version of the reference software, i.e., Joint Exploration Model 7 (JEM 7) can be downloaded from: https://jvet.hhi-.fraunhofer.de/svn/svn_HMJEMSoftware/tags/HM-16.6-JEM-7.0/ The algorithm description for JEM7 is described in J. Chen, E. Alshina, G. J. Sullivan, J.-R. Ohm, J. Boyce "Algorithm description of Joint Exploration Test Model 7 (JEM7)," JVET-G1001, Torino, July 2017. An early draft for a new video coding standard, referred to as the H.266/Versatile Video Coding (VVC) standard, is available in the document JVET-J1001 "Versatile Video Coding (Draft 1)" by Benjamin Bross, and its algorithm description is available in the document JVET-J1002 "Algorithm description for Versatile Video Coding and Test Model 1 (VTM 1)" by Jianle Chen and Elena Alshina. A more recent draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, 16th Meeting: Geneva, CH, 1-11 Oct. 2019, JVET-P2001-v9 (hereinafter "VVC Draft 7"). The techniques of this disclosure can be applied to JEM and VVC, as non-limiting examples, but are not limited to any particular coding standard.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

A video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may include a coding tree block of luma samples, two corresponding coding tree blocks of chroma samples, and syntax structures used to code the samples of the coding tree blocks. In monochrome pictures or pictures having three separate color planes, a CTU may include a single coding tree block and syntax structures used to code the samples of the coding tree block. A coding tree block may be an N×N block of samples. A CTU may also be referred to as a "tree block" or a "largest coding unit" (LCU). The CTUs of HEVC and VVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may include a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may include a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may include a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

The above block structure with CTUs, CUs, PUs, and TUs generally describes one example of a block structure. In general, different video coding standards may use different block structures. As one example, although HEVC allows PUs and TUs to have different sizes or shapes, other video coding standards may require predictive blocks and transform blocks to have a same size. The techniques of this disclosure are not limited to the block structure of HEVC and may be compatible with other block structures such as those of VVC.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may include a sequence of Network Abstraction Layer (NAL) units. A NAL unit is a syntax structure containing an indication of the type of data in the NAL unit and bytes containing that data in the form of a raw byte sequence payload (RB SP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RB SP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Aspects of HEVC and JEM techniques will now be discussed. HEVC employs two in-loop filters including de-blocking filter (DBF) and SAO. Additional details regarding HEVC decoding and SAO are described in C. Fu, E. Alshina, A. Alshin, Y. Huang, C. Chen, Chia. Tsai, C. Hsu, S. Lei, J. Park, W. Han, "Sample adaptive offset in the HEVC standard," IEEE Trans. Circuits Syst. Video Technol., 22(12): 1755-1764 (2012).

The input to a DBF may be the reconstructed image after intra or inter prediction, as shown with the output from the reconstruction block. The DBF performs detection of the artifacts at the coded block boundaries and attenuates the artifacts by applying a selected filter. Compared to the H.264/AVC deblocking filter, the HEVC deblocking filter has lower computational complexity and better parallel processing capabilities while still achieving significant reduction of the visual artifacts. For additional examples, see A. Norkin, G. Bjontegaard, A. Fuldseth, M. Narroschke, M. Ikeda, K. Andersson, Minhua Zhou, G. Van der Auwera, "HEVC Deblocking Filter," IEEE Trans. Circuits Syst. Video Technol., 22(12): 1746-1754 (2012).

In HEVC, the deblocking filter decisions are made separately for each boundary of four-sample length that lies on the grid dividing the picture into blocks of 8×8 samples. Deblocking is performed on a block boundary if the following conditions are true: (1) the block boundary is a prediction unit (PU) or transform unit (TU) boundary; (2) the boundary strength (Bs), as defined in Table 1 below, is greater than zero; (3) variation of signal, as defined in Equation (1) below, on both sides of a block boundary is below a specified threshold.

TABLE 1

Boundary strength (Bs) values for boundaries between two neighboring luma blocks

| Conditions | Bs |
|---|---|
| At least one of the blocks is Intra | 2 |
| At least one of the blocks has non-zero coded residual coefficient and boundary is a transform boundary | 1 |
| Absolute differences between corresponding spatial motion vector components of the two blocks are >=1 in units of integer pixels | 1 |
| Motion-compensated prediction for the two blocks refers to different reference pictures or the number of motion vectors is different for the two blocks | 1 |
| Otherwise | 0 |

If Bs>0 for a luma block boundary, then the deblocking filtering is applied to that boundary, where the following condition holds:

$$|p_{2,0}-2p_{1,0}+p_{0,0}|+|p_{2,3}-2p_{1,3}+p_{0,3}|+|q_{2,0}-2q_{1,0}+q_{0,0}|+|q_{2,3}-2q_{1,3}+q_{0,3}|<\beta$$

HEVC allows for two types of luma deblocking filters, namely: (i) normal filter, and (ii) strong filter. The choice of deblocking filter depends on whether particular signal variation terms are less than certain thresholds (see "HEVC Deblocking Filter" by Norkin et al (2012) cited above for details). Although the filtering decisions are based only on the two rows (columns) of a four pixel long vertical (or horizontal, as the case may be) boundary, the filter is applied to every row (or column, as the case may be) in the boundary. The number of pixels used in the filtering process and the number of pixels that may be modified with each type of filtering is summarized in Table 2 below.

TABLE 2

Number of pixels used/modified per boundary in HEVC deblocking

| | Pixels used (on either side of boundary) | Pixels modified (on either side of boundary) |
|---|---|---|
| Normal filter | 3 or 2 | 2 or 1 |
| Strong filter | 4 | 3 |

Chroma deblocking is performed only when Bs equals two (2). Only one type of chroma deblocking filter is used. The chroma deblocking filter uses pixels $p_0$, $p_1$, $q_0$, $q_1$ and may modify pixels $p_0$ and $q_0$ in each row (the second subscript indicating the row index is omitted in the above description for brevity, because the filter is applied to every row). In JEM, deblocking is performed at CU level. The size of CUs on either side of a boundary can be larger than 8×8. The minimum CU size in JEM is 4×4. Therefore, deblocking filter may also be applied to boundaries of 4×4 blocks.

The input to SAO filtering may be the reconstructed image after applying the deblocking filter, as shown with the output from the deblocking filter. The concept/idea of SAO filtering is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC, the region (the unit for SAO parameters signaling) is defined to be a CTU.

Two SAO types that can satisfy the requirement(s) of low complexity are adopted in HEVC. Those two types are edge offset (EO) and band offset (BO), which are discussed in further detail below. An index of an SAO type is coded. For EO, the sample classification is based on comparison between current samples and neighboring samples according to 1-D directional patterns: horizontal, vertical, 135° diagonal, and 45° diagonal.

Figure 2:
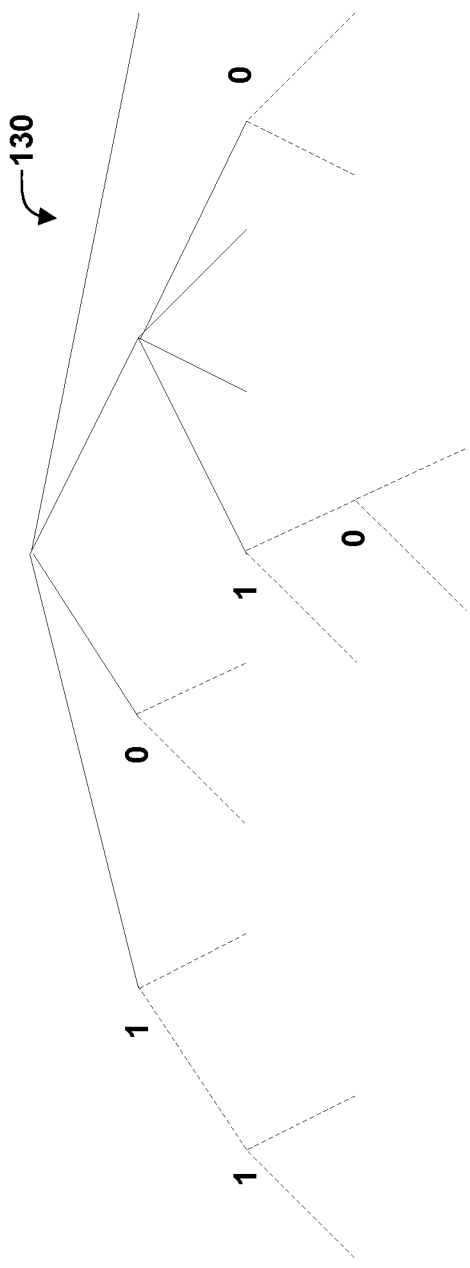
FIG. 2 is a conceptual diagram illustrating an example quadtree binary tree (QTBT) structure.
Figure 3:
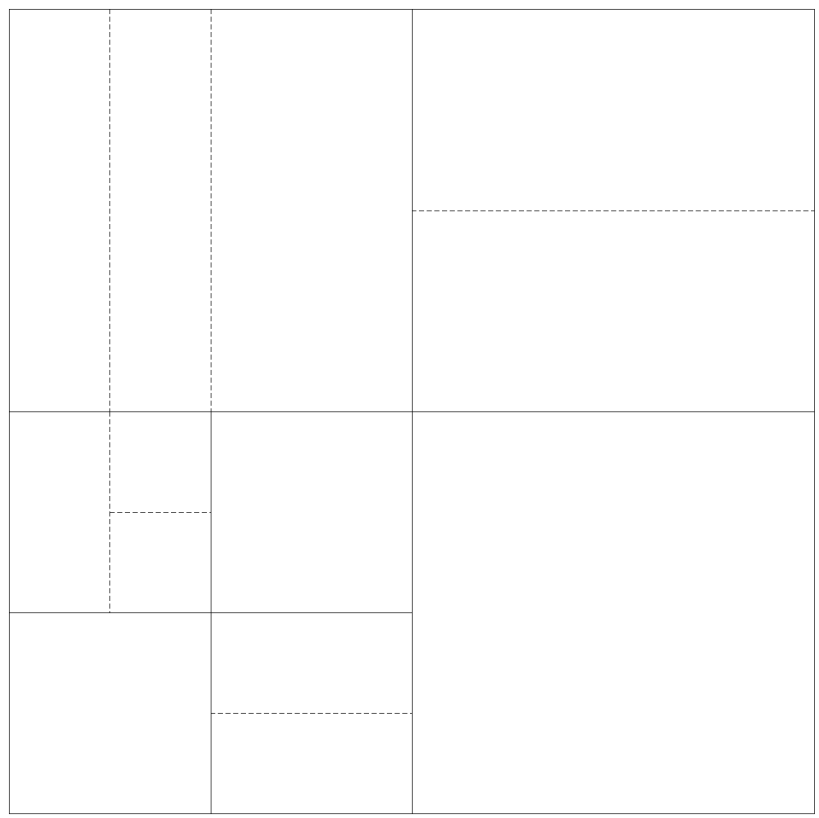
FIG. 3 is a conceptual diagram illustrating a coding tree unit (CTU) corresponding to the QTBT structure illustrated in FIG. 2.

FIGS. 2 and 3 are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 20 may encode, and video decoder 30 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 20 may encode, and video decoder 30 may decode, video data, such as prediction and transform data, for CUs represented by terminal leaf nodes of QTBT structure 130.

In general, CTU 132 of FIG. 3 may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Video encoder 20 and video decoder 30 may be configured to implement various ALF filtering techniques set forth in JEM (e.g., JEM 7). Aspects of these JEM filtering techniques (e.g., ALF) will now be described. In addition to the modified DB and HEVC SAO methods, JEM and VVC include ALF and may include Geometry transformation-based Adaptive Loop Filtering (GALF). The input to ALF/GALF may be the reconstructed image after the application of SAO. Aspects of GALF are described in Tsai, C. Y., Chen, C. Y., Yamakage, T., Chong, I. S., Huang, Y. W., Fu, C. M., Itoh, T., Watanabe, T., Chujoh, T., Karczewicz, M. and Lei, S. M., "Adaptive loop filtering for video coding", IEEE Journal of Selected Topics in Signal Processing, 7(6), pp. 934-945, 2013 and in M. Karczewicz, L. Zhang, W.-J. Chien, and X. Li, "Geometry transformation-based adaptive in-loop filter," Picture Coding Symposium (PCS), 2016.

ALF techniques attempt to minimize the mean square error between original samples and decoded samples by using an adaptive Wiener filter. Denote the input image asp, the source image as S, and the FIR filter as h. Then the following expression of the sum of squared errors (SSE) should be minimized, where (x, y) denotes any pixel position in p or S.

$$SSE = \Sigma_{x,y}(\Sigma_{i,j} h(i,j) p(x-i, y-j) - S(x,y))^2$$

The optimal h, denoted as $h_{opt}$, can be obtained by setting the partial derivative of SSE with respect to h(i, j) equal to 0 as follows:

$$\frac{\partial SSE}{\partial h(i,j)} = 0$$

This leads to the Wiener-Hopf equation shown below, which gives the optimal filter $h_{opt}$:

$$\Sigma_{i,j}h_{opt}(i,j)(\Sigma_{x,y}p(x-i,y-j)p(x-m,y-n)) = \Sigma_{x,y}S(x,y)p(x-m,y-n)$$

In some examples of JEM and VVC, instead of using one filter for the whole picture, samples in a picture are classified into twenty-five (25) classes, based on the local gradients. Separate optimal Wiener filters are derived for the pixels in each class. Several techniques may be employed to increase the effectiveness of ALF by reducing signaling overhead and computational complexity. Some of the techniques that may be used to increase ALF effectiveness by reducing signaling overhead and/or computational complexity are listed below:

1. Prediction from fixed filters: Optimal filter coefficients for each class are predicted using a prediction pool of fixed filters which consists of 16 candidate filters for each class. The best prediction candidate is selected for each class and only the prediction errors are transmitted.
2. Class merging: Instead of using twenty-five (25) different filters (one for each class), pixels in multiple classes can share one filter in order to reduce the number of filter parameters to be coded. Merging two classes can lead to higher cumulative SSE but lower RD cost.
3. Variable number of taps: The number of filter taps is adaptive at the frame level. Theoretically, filters with more taps can achieve lower SSE, but may not be a good choice in terms of Rate-Distortion (R-D) cost, because of the bit overhead associated with more filter coefficients.
4. Block level on/off control: ALF can be turned on and off on a block basis. The block size at which the on/off control flag is signaled is adaptively selected at the frame level. Filter coefficients may be recomputed using pixels from only those blocks for which ALF is on.
5. Temporal prediction: Filters derived for previously coded frames are stored in a buffer. If the current frame is a P or B frame, then one of the stored set of filters may be used to filter this frame if it leads to better RD cost. A flag is signaled to indicate usage of temporal prediction. If temporal prediction is used, then an index indicating which set of stored filters is used is signaled. No additional signaling of ALF coefficients is needed. Block level ALF on/off control flags may be also signaled for a frame using temporal prediction.

Details of some aspects of ALF are summarized briefly in this and the following paragraphs. Some aspects of ALF are related to pixel classification and geometry transformation. Sums of absolute values of vertical, horizontal and diagonal Laplacians at all pixels within a 6×6 window that covers each pixel in a reconstructed frame (before ALF) are computed. The reconstructed frame is then divided into non-overlapped 2×2 blocks. The four pixels in these blocks are classified into one of twenty-five (25) categories, denoted as $C_k$ (k=0, 1, . . . , 24), based on the total Laplacian activity and directionality of that block. Additionally, one of four geometry transformations (no transformation, diagonal flip, vertical flip or rotation) is also applied to the filters based on the gradient directionality of that block. The details can be found in M. Karczewicz, L. Zhang, W.-J. Chien, and X. Li, "Geometry transformation-based adaptive in-loop filter," Picture Coding Symposium (PCS), 2016.

Some aspects of ALF are related to filter derivation and prediction from fixed filters. For each class $C_k$, the best prediction filter is first selected from the pool for $C_k$, denoted as $h_{pred,k}$, based on the SSE given by the filters. The SSE of $C_k$, which is to be minimized, can be written as below, $$SSE_k = \Sigma_{x,y}(\Sigma_{i,j}(h_{pred,k}(i,j)+h_{\Delta,k}(i,j))p(x-i,y-j)-S(x,y))^2,$$
$$k=0,\ldots,24, (x,y) \in C_k,$$

where $k_{\Delta,k}$ is the difference between the optimal filter for $C_k$ and $h_{pred,k}$. Let $p'(x,y)=\Sigma_{i,j}h_{pred,k}(i,j)p(x-i,y-j)$ be the result of filtering pixel $p(x,y)$ by $h_{pred,k}$. Then the expression for $SSE_k$ can be re-written as $$SSE_k = \Sigma_{x,y}\left(\sum_{i,j} h_{\Delta,k}(i,j)p(x-i,y-j) - (S(x,y) - p'(x,y))\right)^2$$

$$k = 0, \ldots, 24, (x,y) \in C_k$$

By making the partial derivative of $SSE_k$ with respect to $h_{\Delta,k}(i,j)$ equal to 0, the modified Wiener-Hopf equation is obtained as follows:

$$\sum_{i,j} h_{\Delta,k}(i,j)\left(\sum_{x,y} p(x-i,y-j)p(x-m,y-n)\right) =$$
$$\sum_{x,y}(S(x,y)-p'(x,y))p(x-m,y-n)$$

$$k = 0, \ldots, 24, (x,y) \in C_k$$

For the simplicity of expression, denote $\Sigma_{x,y}p(x-i,y-j)p(x-m,y-n)$ and $\Sigma_{x,y}(S(x,y)-p'(x,y))p(x-m,y-n)$ with $(x,y) \in C_k$ by $R_{pp,k}(i-m,j-n)$ and $R'_{ps,k}(m,n)$, respectively. Then, the above equation can be written as:

$$\Sigma_{i,j}h_{\Delta,k}(i,j)R_{pp,k}(i-m,j-n)=R'_{ps,k}(m,n) k=0,\ldots,24 \quad (1)$$

For every $C_k$, the auto-correlation matrix $R_{pp,k}(i-m,j-n)$ and cross-correlation vector $R'_{ps,k}(m,n)$ are computed over all $(x,y) \in C_k$.

In one example of ALF, only the difference between the optimal filter and the fixed prediction filter is calculated and transmitted. If none of the candidate filters available in the pool is a good predictor, then the identity filter (i.e., the filter with only one non-zero coefficient equal to 1 at the center that makes the input and output identical) will be used as the predictor.

Some aspects of ALF relate to the merging of pixel classes. Classes are merged to reduce the overhead of signaling filter coefficients. The cost of merging two classes is increased with respect to SSE. Consider two classes $C_m$ and $C_n$ with SSEs given by $SSE_m$ and $SSE_n$, respectively. Let $C_{m+n}$ denote the class obtained by merging $C_m$ and $C_n$ with SSE, denoted as $SS_{m+n}$. $SSE_{m+n}$ is always greater than or equal to $SSE_m + SSE_n$. Let $\Delta SSE_{m+n}$ denote the increase in SSE caused by merging $C_m$ and $C_n$, which is equal to $SSE_{m+n} - (SSE_m + SSE_n)$. To calculate $SSE_{m+n}$, one needs to derive $h_{\Delta,m+n}$, the filter prediction error for $C_{m+n}$, using the following expression similar to (1):

$$\Sigma_{i,j}h_{\Delta,m+n}(i,j)(R_{pp,m}(i-u,j-v)+R_{pp,n}(i-u,j-v))=R'_{ps,m}(u,v)+R'_{ps,n}(u,v) \quad (2)$$

The SSE for the merged category $C_{m+n}$ can then be calculated as:

$$SSE_{m+n} = -\Sigma_{u,v} h_{\Delta,m+n}(u,v)(R'_{ps,m}(u,v)+R'_{ps,n}(u,v)) + (R_{ss,m}+R_{ss,n})$$

To reduce the number of classes from N to N−1, two classes $C_m$ and $C_n$ may need to be found, such that merging them leads to the smallest $\Delta SSE_{m+n}$ compared to any other combinations. Some ALF designs check every pair of available classes for merging to find the pair with the smallest merge cost.

If $C_m$ and $C_n$ (with m<n) are merged, then $C_n$ is marked unavailable for further merging and the auto- and cross-correlations for $C_m$ are changed to the combined auto- and cross-correlations as follows:

$$R_{pp,m} = R_{pp,m} R_{pp,n}$$

$$R'_{ps,m} = R'_{ps,m} + R'_{ps,n}$$

$$R_{ss,m} = R_{ss,m} + R_{ss,n}.$$

An optimal number of ALF classes after merging may need to be decided for each frame based on the RD cost. This is done by starting with twenty-five (25) classes and merging a pair of classes (from the set of available classes) successively until there is only one class left. For each possible number of classes (1, 2, . . . , 25) left after merging, a map indicating which classes are merged together is stored. The optimal number of classes is then selected such that the RD cost is minimized as follows:

$$N_{opt} = \underset{N}{\arg\min} (J|_N = D|_N + \lambda R|_N),$$

where $D|_N$ is the total SSE of using N classes ($D|_N = \Sigma_{k=0}^{N-1} SSE_k$), $R|_N$ is the total number of bits used to code the N filters, and $\lambda$ is the weighting factor determined by the quantization parameter (QP). The merge map for $N_{opt}$ number of classes, indicating which classes are merged together, is transmitted.

Aspects of the signaling of ALF parameters are now described. A brief step-by-step description of the ALF parameter encoding process is given below:

1. Signal the frame level ALF on/off flag.
2. If ALF is on, then signal the temporal prediction flag.
3. If temporal prediction is used, then signal the index of the frame from which the corresponding ALF parameters are used for filtering the current frame.
4. If temporal prediction is not used, then signal the auxiliary ALF information and filter coefficients as follows:
   a. The following auxiliary ALF information is signaled before signaling the filter coefficients.
      i. The number of unique filters used after class merging.
      ii. Number of filter taps.
      iii. Class merge information indicating which classes share the filter prediction errors.
      iv. Index of the fixed filter predictor for each class.
   b. After signaling the auxiliary information, filter coefficient prediction errors are signaled as follows:
      i. A flag is signaled to indicate if the filter prediction errors are forced to zero (0) for some of the remaining classes after merging.
      ii. A flag is signaled to indicate if differential coding is used for signaling filter prediction errors (if the number of classes left after merging is larger than one (1)).
      iii. Filter coefficient prediction errors are then signaled using k-th order Exp-Golomb code, where the k-value for different coefficient positions is selected empirically.
   c. Filter coefficients for chroma components, if available, are directly coded without any prediction methods.
5. Finally, the block-level ALF on/off control flags are signaled.

Provisional U.S. Patent Application No. 62/679,685, filed on 1 Jun. 2018, and Non-Provisional U.S. patent application Ser. No. 16/427,017, filed on 30 May 2019, describe a block-based ALF scheme, in which a block can use temporal filter sets (e.g., ALF sets), which are filter sets (e.g., signaled filter sets) from a previously coded block. The filter sets from the previously coded block may be used for the previously coded block, the previously coded slice that includes the previously coded block, the previously coded tile that includes the previously coded block, and the previously coded picture that includes the previously coded block. The temporal filter sets may be referred to as ALF sets (i.e., the ALF sets are ALF sets of previously coded blocks). If an ALF set is used for a block, the ALF set index information (e.g., index used to identify the ALF set) is included in the bitstream. A 2-D array is used to store ALF sets. Each temporal layer is assigned its own 1-D array which stores ALF sets from pictures/slices/tiles with equal or smaller temporal layer index.

FIG. 4 is a block diagram illustrating an example of memory stores for ALF parameters (e.g., ALF sets) and temporal layer ID information. Provisional U.S. Patent Application No. 62/730,504, filed on 12 Sep. 2018, and Non-Provisional U.S. patent application Ser. No. 16/567,966, filed 11 Sep. 2019, describe techniques according to which, instead of a 2-D array to store temporal filter sets (e.g., ALF sets), a single 1-D array of size N is used to store ALF parameters as shown in FIG. 4. Each memory element stores (i) ALF parameters and (ii) the temporal layer ID (tId) indicating from which layer the corresponding ALF parameters are estimated. The temporal layer information may be needed to ensure that an ALF parameter obtained from a higher temporal layer (e.g., tId=4) is not used for encoding/decoding a frame/slice at a lower temporal layer (e.g., tId=3). According to the implementation illustrated in FIG. 4, a single array of size N is used to store ALF parameters (P1, P2, . . . PN) and associated temporal layer IDs (tId1, tId2, . . . tIdN).

Unlike the 2D buffer, the 1D buffer contains filters from all temporal layers and, accordingly, a temporal scalability constraint may be applied. However, if a 1D temporal filter buffer is used for the techniques described in Provisional U.S. Patent Application No. 62/679,685 and Non-Provisional U.S. patent application Ser. No. 16/427,017, when filling the filter sets buffer for current picture/slice/tile/block and signaling the temporal buffer index, a mismatch could be introduced if or when some pictures/slices/tiles are lost during transmission.

As an example, video encoder 20 and video decoder 30 may each include a buffer that stores information similar to the example shown in FIG. 4. However, based on the temporal layer identification values (e.g., temporal layer ID), the information stored in the respective buffers may be different. For example, video encoder 20 may be configured to process and encode all pictures (e.g., frames) regardless of the temporal layer ID of the picture. This is because source device 12, which includes video encoder 20, may be configured to generate video data that is to be consumed by many different examples of destination device 14. Accordingly, video encoder 20 may generate a bitstream that includes encoded video data for pictures in all layers (i.e., process and encode video data for all pictures regardless of the temporal layer ID of the picture). Also, video encoder 20 may be configured to store ALF sets and associated temporal layer identification values as illustrated in FIG. 4.

However, not all examples of destination device 14 may process video data for all layers. As one example, a first example of destination device 14 may process video data only for layers having a temporal layer ID of 0 and a second example of destination device 14 may process video data only for layers having a temporal layer ID of 2 or less than 2. In this example, both the first and the second example of destination device 14 may receive video data for all layers, but may only process layers having temporal layer ID of 0, for the first example of destination device 14, or 2 or less, for the second example of destination device 14.

In some examples, some hardware device or devices in the path to the first and second examples of destination device 14 may be configured to strip out video data for layers greater than 0 for the first example of destination device 14 and strip out video data for layers greater than 2 for the second example of destination device 14. In such examples, the first example of destination device 14 may not even receive video data for pictures having temporal layer ID greater than 0, and the second example of destination device 14 may not even receive video data for pictures having temporal layer ID greater than 2.

In any event, because video decoder 30 of the first and second examples of destination device 14 process fewer pictures than video encoder 20, the ALF sets of previously coded blocks at video decoder 30 for both the first and second examples of destination device 14 may be different than the ALF sets of previously coded blocks stored by video encoder 20.

As an example, a buffer for video encoder 20 that stores ALF sets (e.g., ALF sets of previously coded blocks) and temporal layer IDs may store: {Alf(P7, layer ID 0), Alf(P6, layer ID 2), Alf(P5, layer ID 0), Alf(P4, layer ID 1), and Alf(P3, layer ID 0)}. For instance, ALF set P7 refers to a first set of ALF parameters and may be associated with temporal layer ID 0, ALF set P6 refers to a second set of ALF parameters and may be associated with temporal layer ID 2, ALF set P5 refers to a third set of ALF parameters and may be associated with temporal layer ID 0, ALF set P4 refers to a fourth set of ALF parameters and may be associated with temporal layer ID 1, and ALF set P3 refers to a fifth set of ALF parameters and may be associated with temporal layer ID 0.

For video decoder 30 that only receives or only processes pictures with temporal layer ID of 0, the buffer of video decoder 30 may not include ALF set P4 and ALF set P6. This is because ALF set P4 and ALF set P6 are associated with temporal layer ID 1 and 2, respectively, and this example of video decoder 30 only receives or only processes pictures with temporal layer ID of 0. Accordingly, the buffer of video decoder 30 that stores ALF sets and temporal layer identification values in this example would include: {Alf(P7, layer ID 0), Alf(P5, layer ID 0), and Alf(P3, layer ID 0)}.

In addition, the buffer of video decoder 30 that stores ALF sets and temporal layer identification values may also store ALF sets of some additional previous pictures. For example, the buffer for both video encoder 20 and video decoder 30 used to store ALF sets may have a fixed size (e.g., 5). After encoding or decoding of a picture, one of the ALF sets is removed and a new ALF set is added to the buffer. Therefore, in this example, the buffer for video encoder 20 may include: {Alf(P7, layer ID 0), Alf(P6, layer ID 2), Alf(P5, layer ID0), Alf(P4, layer ID 1), and Alf(P3, layer ID 0)}. The buffer for video decoder 30 may include {Alf(P7, layer ID 0), Alf(P5, layer ID0), and Alf(P3, layer ID 0)} but would also include ALF sets for two earlier decoded pictures since there can be up to 5 ALF sets in the buffer. Therefore, the buffer for video decoder 30 may include {Alf(P7, layer ID 0), Alf(P5, layer ID 0), Alf(P3, layer ID 0), Alf(P2, layer ID0), and Alf(P1, layer ID 0)}.

In this example, the buffer for video encoder 20 and the buffer for video decoder 30 store different ALF sets. For instance, the buffer for video encoder 20 includes {Alf(P7, layer ID 0), Alf(P6, layer ID 2), Alf(P5, layer ID0), Alf(P4, layer ID 1), and Alf(P3, layer ID 0)} and the buffer for video decoder 30 includes {Alf(P7, layer ID 0), Alf(P5, layer ID 0), Alf(P3, layer ID 0), Alf(P2, layer ID0), and Alf(P1, layer ID 0)}. In this example, the buffer for video encoder 20 includes Alf(P4, layer ID 1) and Alf(P6, layer ID 2) that the buffer for video decoder 30 does not include, and the buffer for video decoder 30 includes Alf(P1, layer ID 0) and Alf(P2, layer ID 0) that the buffer for video encoder 20 does not include.

Accordingly, if video encoder 20 were to signal an index into the buffer that identifies the ALF set to use for filtering a current block to video decoder 30, the mismatch in the buffers may lead to errors. For example, if Alf(P3) is to be used for filtering, video encoder 20 may signal an index value of 4 since Alf(P3) is the fifth entry in the buffer for video encoder 20. However, index value 4 refers to Alf(P1) for video decoder 30, since Alf(P1) is the fifth entry in the buffer for video decoder 30.

This disclosure describes techniques and system configurations that may mitigate or potentially eliminate some of the problems listed above. It will be appreciated that the techniques listed below may be implemented individually, or any combination of the listed techniques (in various sequences or in parallel) may be implemented, in accordance with aspects of this disclosure.

In some examples, the number of available filter sets in temporal buffer could be signaled for current picture/slice/tile/block. That is, video encoder 20 may signal a size of a list of ALF sets from which one of the ALF sets may be used as the ALF set for adaptive loop filtering a current block. Video encoder 20 may construct the list of ALFs and signal an index into the list of ALF sets. Video decoder 30 may receive information indicative of the size of the list of ALF sets and construct the list of the ALF sets based on the indicated size. Video decoder 30 may also receive an index into the list of ALF sets and may determine an ALF set based on the index (e.g., determine one of the ALF sets for the current block based on the constructed list of ALF sets).

As one example, in determining the available ALF sets, video encoder 20 may determine the available ALF sets stored in a buffer of video encoder 20 that can be utilized for performing adaptive loop filtering for a current block. Video encoder 20 may determine a temporal layer ID for the current block, and may determine that ALF sets associated with temporal layer IDs less than or equal to temporal layer ID for the current block are available to be utilized for performing adaptive loop filtering for the current block. Of the available ALF sets (e.g., those associated with temporal layer IDs less than or equal to temporal layer ID for the current block), video encoder 20 may determine a size of a list of ALF sets. In some examples, the size of the list of ALF sets may be equal to the number of available ALF sets. In such examples, determining the size of the ALF sets may be the same as determining the number of available ALF sets. In some examples, video encoder 20 may determine the size of the ALF sets as a number that is less than the number of available ALF sets.

The size of the list of ALF sets may be N, where N is less than or equal to the number of available ALF sets (e.g., ALF sets having temporal layer ID less than or equal to temporal layer ID of current block). Video encoder 20 may construct the list of ALF sets. As one example, the list of ALF sets may be the N most recently added ALF sets to the buffer that stores the ALF sets having temporal layer IDs less than or equal to the temporal layer ID of the current block.

As an example, the buffer may store 5 ALF sets and the temporal layer ID for the current block may be 2. In the example, video encoder 20 may determine how many of the 5 ALF sets have a temporal layer ID that is less than or equal to 2. In this example, assume there are 3 ALF sets associated with temporal layer ID that is less than or equal to 2. In this example, video encoder 20 may determine the available ALF sets stored in the buffer that can be utilized for performing adaptive loop filtering for a current block as being equal to 3. Video encoder 20 may determine a size of the list of ALF sets (e.g., a value less than or equal to 3). In this example, assume that the size of the list of ALF sets may be the same as available ALF sets stored in the buffer that can be utilized for performing adaptive loop filtering for the current block.

Video encoder 20 may then construct a list of ALF sets based on the size of the list of ALF sets. As one example, video encoder 20 may include the most recently added ALF sets having temporal layer IDs less than or equal to the temporal ID of the current block into the list of ALF sets until the size of the list of ALF sets is reached.

Video encoder 20 may signal information indicative of the size of the list of ALF sets to video decoder 30. Video decoder 30 may then construct the list of ALF sets based on the information indicative of the size (e.g., based on the indicated size) of the list of ALF sets. For example, video decoder 30 may determine available ALF sets store in its buffer that can be utilized for performing adaptive loop filtering on the current block. For instance, video decoder 30 may determine which ones of the ALF sets stored in its buffer are associated with a temporal layer ID that is less than or equal to the temporal layer ID of the current block. In the above example where the temporal layer ID of the current block is 2, video decoder 30 may determine the available ALF sets stored in its buffer that can be utilized for performing adaptive loop filtering on the current block as the ALF sets associated with a temporal layer ID of less than or equal to 2.

As described above, video encoder 20 may signal information indicative of the size of the list of ALF sets, and therefore, video decoder 30 may receive information indicative of the size of the list of ALF sets. Video decoder 30 may include the most recently added ALF sets, to the buffer, having temporal layer IDs less than or equal to the current block into the list of ALF sets (e.g., add ALF sets from the determined available ALF sets) until the size of the list of ALF sets is reached.

With this constraint, if the ALF sets are used to fill a filter sets buffer described in Provisional U.S. Patent Application No. 62/679,685 and Non-Provisional U.S. patent application Ser. No. 16/427,017, the number of temporal filter sets filled in the filter sets buffer can match between video encoder 20 and video decoder 30. Stated another way, by determining the size of the list of ALF sets and constraining the list of ALF sets to the determined size, it may be possible to ensure that the list of ALF sets for video encoder 20 and video decoder 30 is the same.

For instance, in the above example, the buffer for video encoder 20 includes {Alf(P7, layer ID 0), Alf(P6, layer ID 2), Alf(P5, layer ID 0), Alf(P4, layer ID 1), and Alf(P3, layer ID 0)} and the buffer for video decoder 30 includes {Alf(P7, layer ID 0), Alf(P5, layer ID 0), Alf(P3, layer ID 0), Alf(P2, layer ID0), and Alf(P1, layer ID 0)}. For a current block having a temporal layer ID of 0, video encoder 20 may determine that the available ALF sets is 3 (e.g., Alf(P7, layer ID 0), Alf(P5, layer ID 0), and Alf(P3, layer ID 0)). Video encoder 20 may determine a size of the list of ALF sets. For instance, video encoder 20 may determine the size of the list of ALF sets is equal to the available ALF sets (e.g., 3), and may select the 3 most recently added ALF sets, to the buffer, having a temporal layer ID less than or equal to temporal layer of the current block (e.g., 0) to construct the list of ALF sets. For instance, video encoder 20 may retrieve the determined available ALF sets until the size of the list of ALF sets is reached.

In this example, the list of ALF sets includes Alf(P7), Alf(P5), and Alf(P3). Video encoder 20 may signal the value of 3 to video decoder 30 to indicate the size of the list of ALF sets.

Video decoder 30 may determine the available ALF sets stored in its buffer that can be utilized for performing adaptive loop filtering on the current block. In this example, because the temporal layer ID for the current block is 0, then all of the ALF sets in the buffer of video decoder 30 may be determined as being available for performing adaptive loop filtering on the current block. However, in another example, if the buffer for video decoder 30 stored ALF sets are associated with temporal layer IDs of 2 or less than 2, and the temporal layer ID for the current block is 1, then video decoder 30 may determine the available ALF sets from the stored ALF sets having a temporal layer ID less than or equal to 1 as the available ALF sets that can be used for performing adaptive loop filtering on the current block.

As described, video decoder 30 may receive information indicative of the size of the list of the ALF sets. Video decoder 30 may construct a list of ALF sets based on the received size of the list of ALF sets. For example, video decoder 30 may select the 3 most recently added ALF sets that were added to the buffer and having a temporal layer ID less than or equal to the temporal layer ID of the current block (e.g., select the 3 most recently ALF sets from the determined available ALF sets) and add the selected ALF sets to the list of ALF sets. In this example, the 3 most recently added ALF sets include Alf(P7), Alf(P5), and Alf(P3). Therefore, even though the buffer of video encoder 20 and the buffer of video decoder 30 store different ALF sets, the list of ALF sets that video encoder 20 and video decoder 30 construct may be the same due to video encoder 20 constraining the size of the list of ALF sets and signaling the size to video decoder 30.

In some examples, with this constraint, the number of available filter sets for each block is known and truncated coding techniques, such as truncated binary coding, could be used to signal the filter set index for a block (e.g., with respect to signaling of a bitstream from video encoder 20 to video decoder 30). Video decoder 30 may utilize truncated binary decoding techniques to determine the filter set index.

For example, video encoder 20 may signal an index into the list of ALF sets that identifies the ALF set that is to be used for adaptive loop filtering the current block. In some examples, video encoder 20 may truncated binary encode the index. Video decoder 30 may receive the truncated binary encoded index and decode the truncated binary encoded index to generate a decoded index. Video decoder 30 may determine the ALF set to use for adaptive loop filtering the current block based on the decoded index into the list of ALF sets.

When the number of available filter sets in temporal buffer is not signaled (e.g., if video encoder 20 does not signal the number of available filter sets in the temporal buffer to video decoder 30) for a current picture/slice/tile, two separated filter sets buffers can be used. Video encoder 20 may signal a flag to indicate which buffer is used. One buffer is filled with pre-defined filter sets and new filter set. There may be no constraint on the method to signal the filter set index in this buffer. The other buffer is filled with temporal filter sets, and truncated coding methods may not be used to signal the index in this buffer.

In some examples, only one buffer is used to be filled with one or more pre-defined filter sets, new filter sets, and temporal filter sets. In such examples, in some cases, the one or more pre-defined filter sets and new filter sets may be filled followed by temporal filter sets. The filter set index in this buffer may not be signaled with a truncated coding method such as truncated binary coding. Alternatively, video encoder 20 may signal a flag to indicate whether a temporal filter set is used. If the flag is set to true, video encoder 20 may signal the temporal filter set index, and in some examples, the temporal filter set index should be signaled with a non-truncated signaling (e.g., non-truncated coding such as binary coding) method since the maximum number may be unknown. If the flag is set to false, there may be no limitation about the signaling method on pre-defined and new filter set indices.

Figure 5:
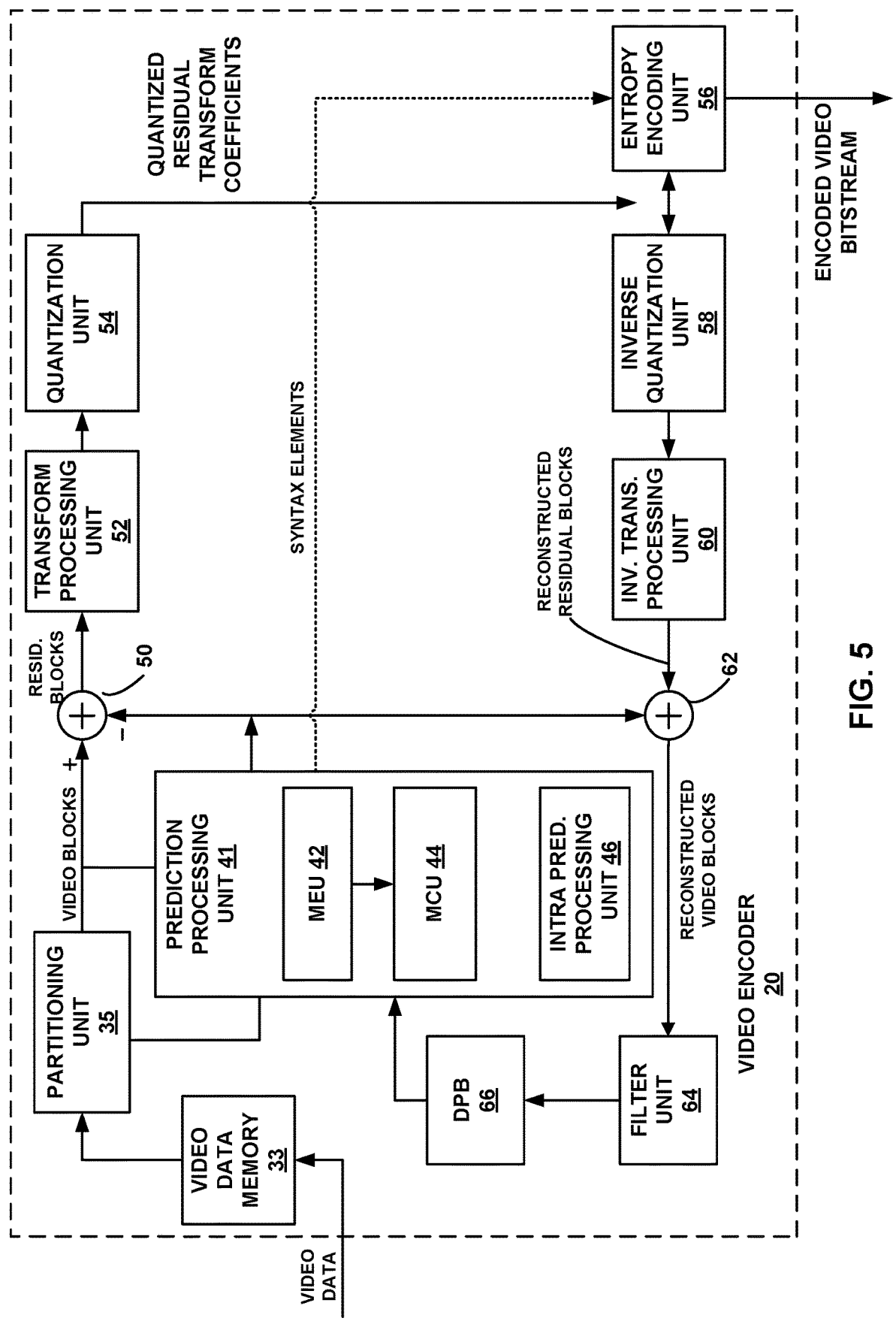
FIG. 5 is a block diagram illustrating an example video encoder that may implement the techniques described in this disclosure.

FIG. 5 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

The various units of FIG. 5 are illustrated to assist with understanding the operations performed by video encoder 20. The units may be implemented as fixed-function circuits, programmable circuits, or a combination thereof (e.g., processing circuitry). Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 20 may include arithmetic logic units (ALUs), elementary function units (EFUs), digital circuits, analog circuits, and/or programmable cores, formed from programmable circuits. In examples where the operations of video encoder 20 are performed using software executed by the programmable circuits, memory may store the instructions (e.g., object code) of the software that video encoder 20 receives and executes, or another memory within video encoder 20 (not shown) may store such instructions.

In the example of FIG. 5, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 5, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 may perform any type of filtering such as deblock filtering, SAO filtering, peak SAO filtering, ALF, and/or GALF, and/or other types of loop filters. A deblock filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

As one example, filter unit 64 may be configured to perform adaptive loop filtering after a decoding loop (e.g., reconstruction loop) in an encoding process. For instance, inverse quantization unit 58, inverse transform processing unit 60, and summer 62 may together form a decoding loop in the encoding process so as to create reconstructed video blocks that can be used as prediction blocks for subsequent blocks.

In one or more examples described in this disclosure, filter unit 64 and entropy encoding unit 56 may be configured to perform the example techniques described in this disclosure. Filter unit 64 and entropy encoding unit 56 performing the example techniques is described for ease of understanding and should not be considered limiting. Filter unit 64, entropy encoding unit 56, and/or other components of video encoder 20 may be configured to perform the example techniques.

As one example, filter unit 64 may determine available ALF sets stored in a buffer (e.g., video data memory 33, DPB 66, or some other memory) that can be utilized for performing adaptive loop filtering on a current block. For example, filter unit 64 may determine a temporal layer identification value for the current block and which ALF sets stored in the buffer have temporal layer identification values less than or equal to the temporal layer identification value for the current block. That is, the available ALF sets include ALF sets having a temporal layer identification value that is less than or equal to a temporal layer identification value of the current block. The ALF sets stored in the buffer include ALF sets of previously coded blocks. In some examples, the previously coded blocks may be blocks of a different picture than the current picture that includes the current and/or blocks of the current picture.

In some examples, filter unit 64 may determine a size of a list of ALF sets, which may be less than or equal to the number of available ALF sets. In examples where the size of the list of ALF sets is equal to the number of available ALF sets, filter unit 64 determining the size of the list of ALF sets may be considered to be part of filter unit 64 determining the available ALF sets.

Filter unit 64 may construct the list of ALF sets from the determined available ALF sets based on the size of the list of ALF sets. For example, filter unit 64 may retrieve the determined available ALF sets until the size of the list of the ALF sets is reached. As described above, the determined available ALF sets are those associated with temporal layer identification values that are less than or equal to the temporal layer identification value of the current block.

Filter unit 64 may determine an ALF set for the current block based on the list of ALF sets (e.g., determine one of the ALF sets for the current block based on the constructed list of ALF sets). For example, filter unit 64 may select an ALF set from the list of ALF sets as the ALF set for the current block. As another example, filter unit 64 may select an ALF set from the list of ALF sets and add an offset to determine the ALF set for the current block. Filter unit 64 may perform adaptive loop filtering on the current block based on the determined ALF set.

In one or more examples, entropy encoding unit 56 may be configured to signal information indicative of the size of the list of ALF sets for video decoder 30 to eventually receive. Filter unit 64 may output, to entropy encoding unit 56, an index in the list of ALF sets that identifies the ALF set that filter unit 64 utilized to determine the ALF set for the current block. In some examples, entropy encoding unit 56 may signal the index into the list of ALF sets that identifies the determined ALF set. For example, entropy encoding unit 56 may truncated binary encode the index into the list of ALF sets and signal the truncated binary encoded index into the list of ALF sets.

Figure 6:
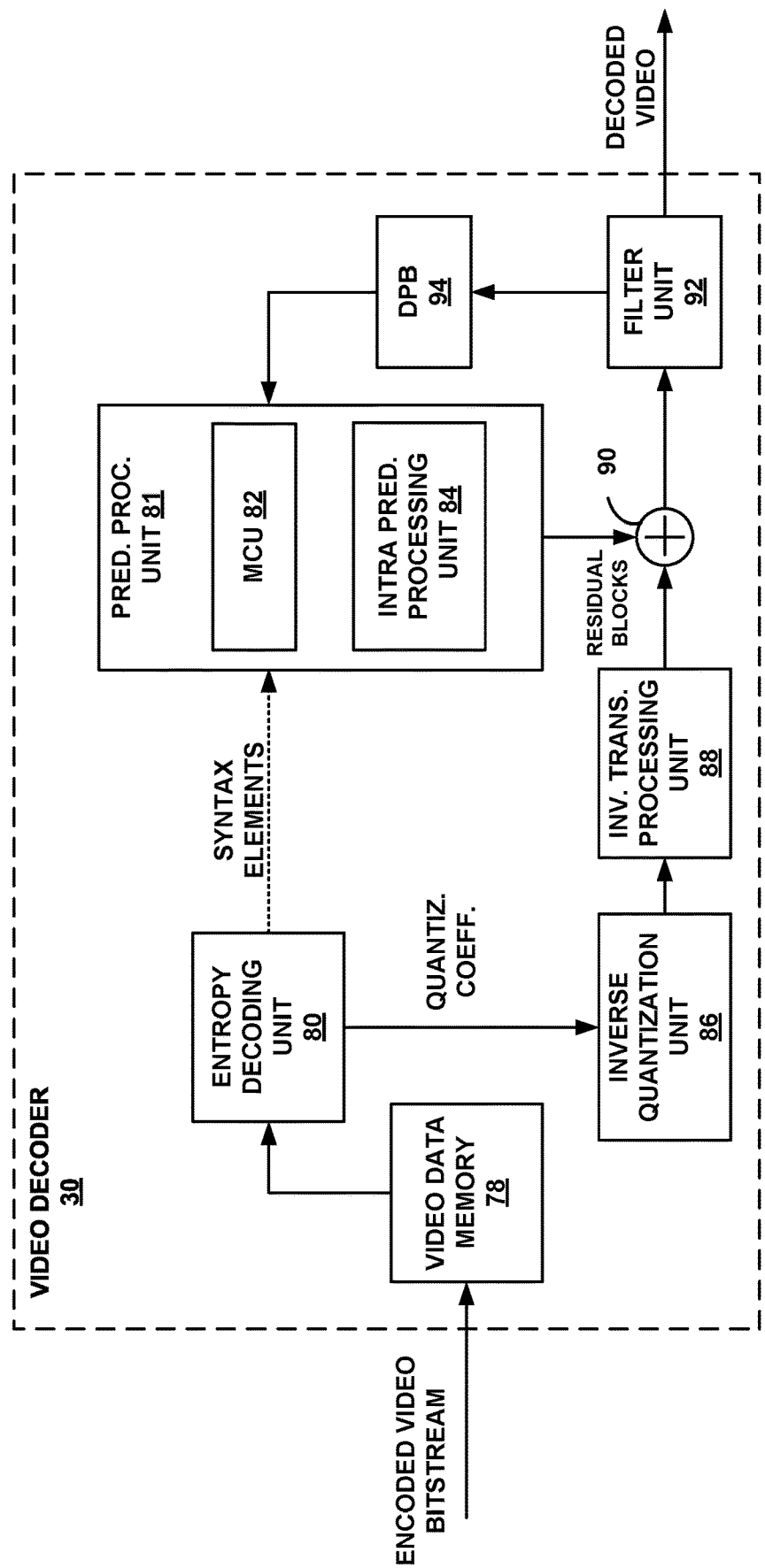
FIG. 6 is a block diagram illustrating an example video decoder that may implement the techniques described in this disclosure.

FIG. 6 is a block diagram illustrating an example video decoder 30 that may implement the techniques described in this disclosure. The various units of FIG. 6 are illustrated to assist with understanding the operations performed by video decoder 30. The units may be implemented as fixed-function circuits, programmable circuits, or a combination thereof (e.g., processing circuitry). Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 30 may include arithmetic logic units (ALUs), elementary function units (EFUs), digital circuits, analog circuits, and/or programmable cores, formed from programmable circuits. In examples where the operations of video decoder 30 are performed using software executed by the programmable circuits, memory may store the instructions (e.g., object code) of the software that video decoder 30 receives and executes, or another memory within video decoder 30 (not shown) may store such instructions.

Video decoder 30 of FIG. 6 may, for example, be configured to receive the signaling described above with respect to video encoder 20 of FIG. 5. In the example of FIG. 6, video decoder 30 includes video data memory 78, entropy decoding unit 80, prediction processing unit 81, inverse quantization unit 86, inverse transform processing unit 88, summer 90, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 5.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit 81 generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation.

Filter unit 92 filters the reconstructed block (e.g. the output of summer 90) and stores the filtered reconstructed block in DPB 94 for uses as a reference block. The reference block may be used by motion compensation unit 82 as a reference block to inter-predict a block in a subsequent video frame or picture. Filter unit 92 may perform any type of filtering such as deblock filtering, SAO filtering, peak SAO filtering, ALF, and/or GALF, and/or other types of loop filters. A deblock filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

As one example, filter unit 92 may be configured to perform adaptive loop filtering as part of the decoding process. For instance, filter unit 92 may perform adaptive loop filtering to generate the decoded video data that is output for display. Also, in some examples, filter unit 92 may perform adaptive loop filtering to generate a prediction block that may be used as a predictor for decoding a subsequent block.

In one or more examples described in this disclosure, filter unit 92 and entropy decoding unit 80 may be configured to perform the example techniques described in this disclosure. Filter unit 92 and entropy decoding unit 80 performing the example techniques is described for ease of understanding and should not be considered limiting. Filter unit 92, entropy decoding unit 80, and/or other components of video decoder 30 may be configured to perform the example techniques.

As one example, filter unit 92 may determine available ALF sets stored in a buffer (e.g., video data memory 78, DPB 94, or some other memory) that can be utilized for performing adaptive loop filtering on the current block. For example, filter unit 92 may determine a temporal layer identification value for the current block (e.g., based on a temporal layer identification value signaled by video encoder 20) and which ALF sets stored in the buffer have temporal layer identification values less than or equal to the temporal layer identification value for the current block. That is, the available ALF sets include ALF sets having a temporal layer identification value that is less than or equal to a temporal layer identification value of the current block. The ALF sets stored in the buffer include ALF sets of previously coded blocks. In some examples, the previously coded blocks may be blocks of a different picture than the current picture that includes the current and/or blocks of the current picture.

In some examples, filter unit 92 may determine a size of a list of ALF sets, which may be less than or equal to the number of available ALF sets. For example, entropy decoding unit 80 may receive information indicative of the size of the list of ALF sets and output the information indicative of the size of the list of ALF sets to filter unit 92.

Filter unit 92 may construct the list of ALF sets from the determined available ALF sets based on the size of the list of ALF sets. For example, filter unit 92 may retrieve the determined available ALF sets until the size of the list of the ALF sets is reached. As described above, the determined available ALF sets are those associated with temporal layer identification values that are less than or equal to the temporal layer identification value of the current block.

Filter unit 92 may determine an ALF set for the current block based on the list of ALF sets (e.g., determine one of the ALF sets for the current block based on the constructed list of ALF sets). Filter unit 92 may receive an index into the list of ALF sets and may determine the ALF set from the index. As one example, entropy decoding unit 80 may receive a truncated binary encoded index into the list of ALF sets and decode the truncated binary encoded index to generate a decoded index. Filter unit 92 may determine the ALF set based on the decoded index into the list of ALF sets that identifies determined the ALF set.

In some examples, filter unit 92 may select the ALF set identified by the decoded index into the list of ALF sets as the ALF set for the current block. As another example, filter unit 92 may select the ALF set identified by the decoded index into the list of ALF sets and add an offset to determine the ALF set for the current block. Filter unit 92 may perform adaptive loop filtering on the current block based on the determined ALF set.

Figure 7:
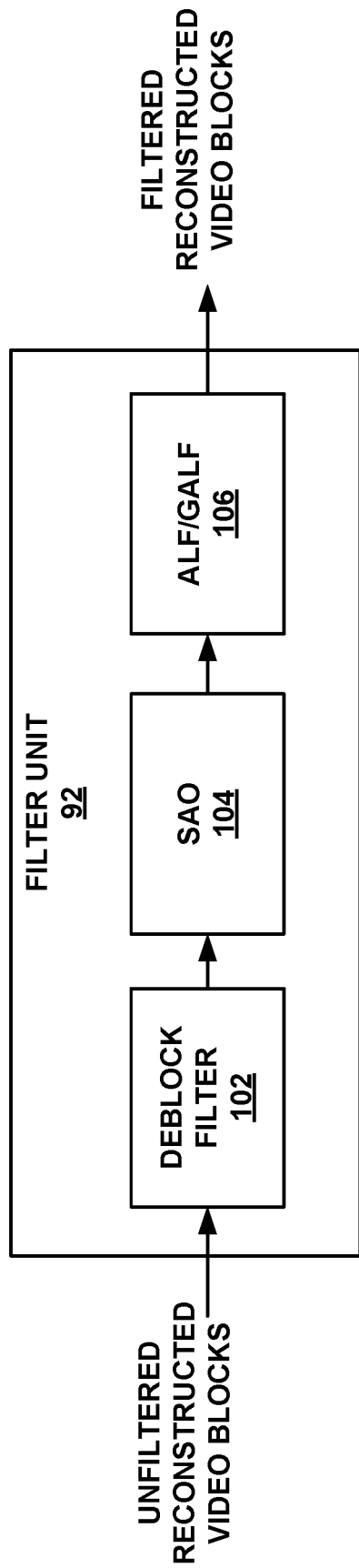
FIG. 7 shows an example implementation of a filter unit for performing the techniques of this disclosure.

FIG. 7 shows an example implementation of filter unit 92. Filter unit 64 may be implemented in the same manner. Filter units 64 and 92 may perform the techniques of this disclosure, possibly in conjunction with other components of video encoder 20 or video decoder 30. In the example of FIG. 7, filter unit 92 includes deblock filter 102, SAO filter 104, and ALF/GALF filter 106. SAO filter 104 may, for example, be configured to determine offset values for samples of a block in the manner described in this disclosure. For example, ALF/GALF filter 106 may be configured to perform the example techniques described in this disclosure.

Filter unit 92 may include fewer filters and/or may include additional filters. Additionally, the particular filters shown in FIG. 7 may be implemented in a different order. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Figure 8:
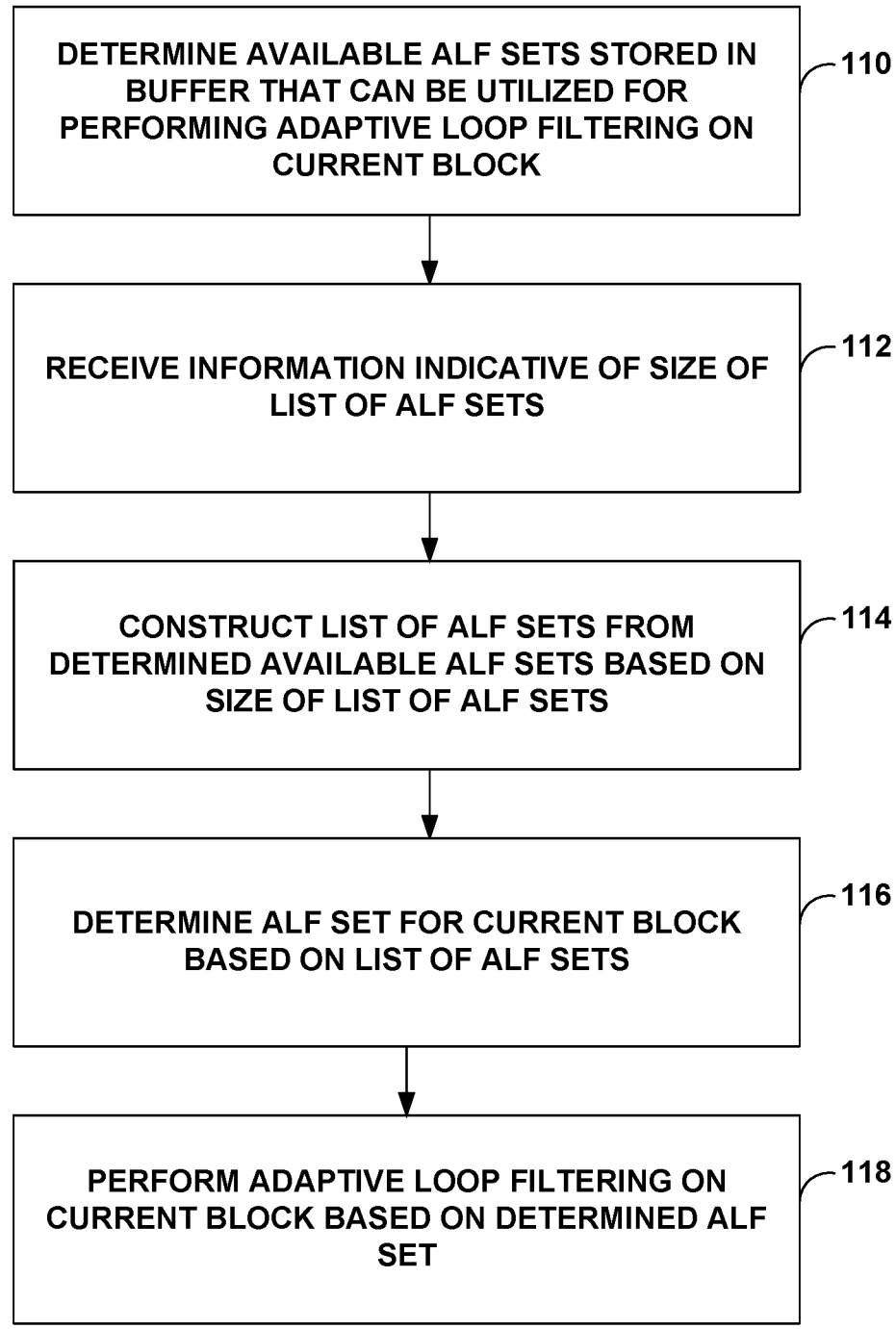
FIG. 8 is a flowchart illustrating an example method of filtering video data.

FIG. 8 is a flowchart illustrating an example method of filtering video data. The example techniques illustrated in FIG. 8 may be performed by video decoder 30 (e.g., via filter unit 92 and entropy decoding unit 80). For ease of description, the example techniques are described with respect to processing circuitry and a buffer. Examples of the processing circuitry include video decoder 30. For video decoder 30, examples of the buffer include video data memory 78, DPB 94, or other memory coupled to or accessible by video decoder 30.

Moreover, the example flowchart of FIG. 8 should not be construed as requiring a particular order of operation. The example operations illustrated in FIG. 8 may be performed in a different order. As one example, the processing circuitry may be configured to receive information indicative of a size of the list of ALF sets before determining available ALF sets.

In the example illustrated in FIG. 8, a buffer may store ALF sets, where the ALF sets include ALF sets of previously coded blocks. In some examples, the previously coded blocks may be blocks of a different picture than the current picture that includes the current and/or blocks of the current picture. The processing circuitry may determine available ALF sets stored in the buffer that can be utilized for performing adaptive loop filtering on a current block (110). The available ALF sets may include ALF sets having a temporal layer identification value that is less than or equal to a temporal layer identification value of the current block.

In examples where the processing circuitry is for video decoder 30, the processing circuitry may be configured to receive information indicative of the size of the list of ALF sets (112). The processing circuitry may be configured to construct the list of ALF sets from the determined available ALF sets based on the indicated size of the list of ALF sets (114). For example, the processing circuitry may construct the list of ALF sets by retrieving the determined available ALF sets (e.g., the most recent ALF sets stored in the buffer) until the size of the list of the ALF sets is reached.

The processing circuitry may determine one of the ALF sets for the current block based on the constructed list of ALF sets (116). As one example, where the processing circuitry is for video decoder 30, the processing circuitry may receive an index into the list of ALF sets that identifies the ALF set to determine the ALF set for the current block. For example, the processing circuitry may receive a truncated binary encoded index, decode the truncated binary encoded index to generate a decoded index, and determine the ALF set based on the decoded index into the list of ALF sets that identifies the determined ALF set.

The processing circuitry may perform adaptive loop filtering on the current block based on the determined ALF set (118). For example, where the processing circuitry is for video decoder 30, the processing circuitry may perform the adaptive loop filtering as part of a decoding process.

Figure 9:
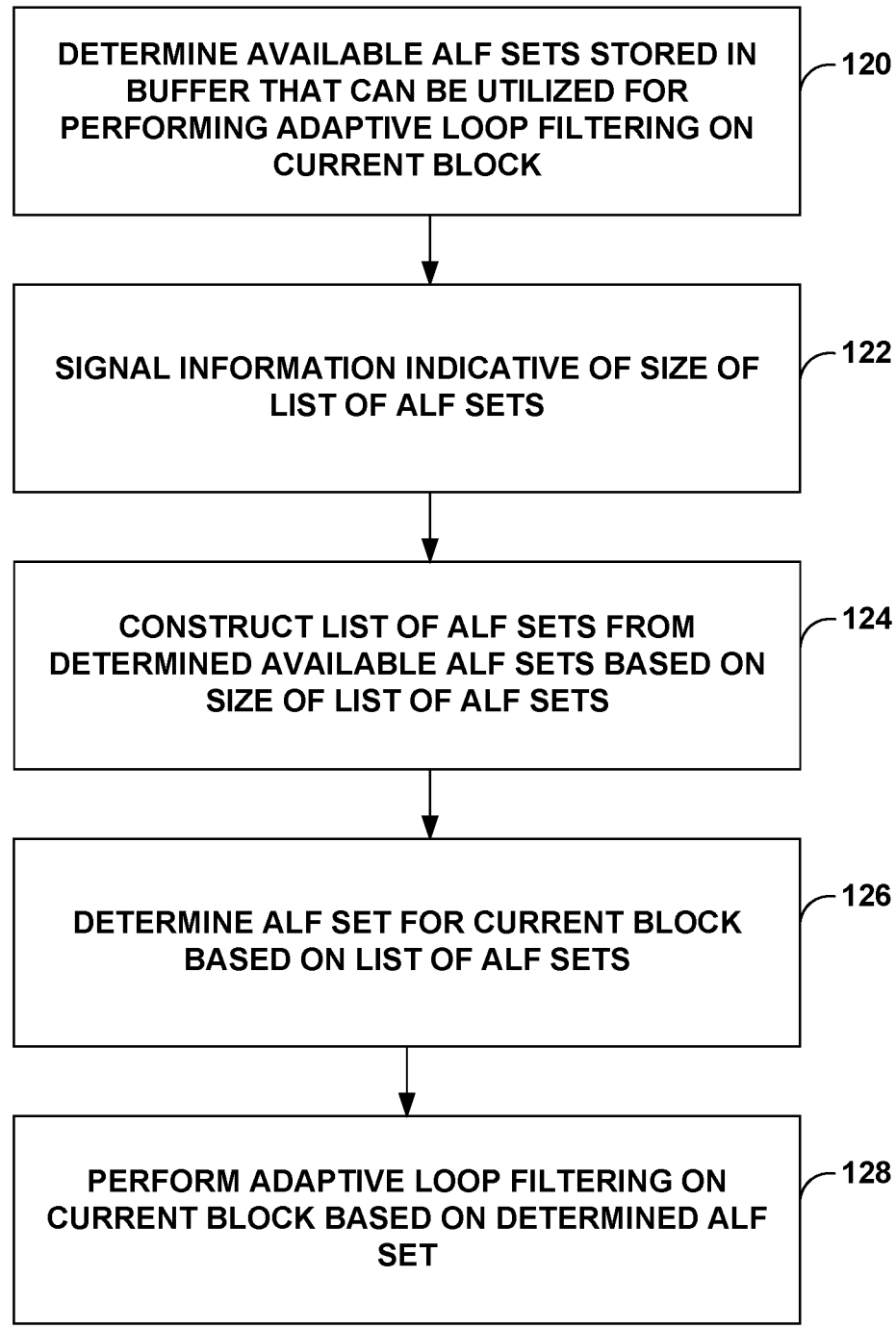
FIG. 9 is a flowchart illustrating another example method of filtering video data.

FIG. 9 is a flowchart illustrating another example method of filtering video data. The example techniques illustrated in FIG. 9 may be performed by video encoder 20 (e.g., via filter unit 64 and entropy encoding unit 56). For ease of description, the example techniques are described with respect to processing circuitry and a buffer. Examples of the processing circuitry include video encoder 20. For video encoder 20, examples of the buffer include video data memory 33, DPB 66, or other memory coupled to or accessible by video encoder 20 or components of video encoder 20.

Moreover, the example flowchart of FIG. 9 should not be construed as requiring a particular order of operation. The example operations illustrated in FIG. 9 may be performed in a different order. As one example, the processing circuitry may construct the list of ALF sets from the determined available ALF sets, determine an ALF set for the current block (e.g., determine one of the ALF sets for the current block based on the constructed list of ALF sets), and/or perform adaptive loop filtering before or in parallel with signaling information indicative of the size of the list of ALF sets.

In the example illustrated in FIG. 9, a buffer may store ALF sets, where the ALF sets include ALF sets of previously coded blocks. In some examples, the previously coded blocks may be blocks of a different picture than the current picture that includes the current and/or blocks of the current picture. The processing circuitry may determine available ALF sets stored in the buffer that can be utilized for performing adaptive loop filtering on a current block (120). The available ALF sets may include ALF sets having a temporal layer identification value that is less than or equal to a temporal layer identification value of the current block.

In examples where the processing circuitry is for video encoder 20, the processing circuitry may be configured to determine a size of a list of ALF sets based on the determined available ALF sets. In such examples, the processing circuitry may signal information indicative of the size of the list of ALF sets (122). The processing circuitry may be configured to construct the list of ALF sets from the determined available ALF sets based on the indicated size of the list of ALF sets (124). For example, the processing circuitry may construct the list of ALF sets by retrieving the determined available ALF sets (e.g., the most recent ALF sets stored in the buffer) until the size of the list of the ALF sets is reached.

The processing circuitry may determine one of the ALF sets for the current block based on the constructed list of ALF sets (126). As one example, where the processing circuitry is for video encoder 20, the processing circuitry may select an ALF set from the list of ALF set and set the selected ALF set as the ALF set for the current block or may add an offset to the selected ALF set to determine the ALF set for the current block. The processing circuitry may signal an index into the list of ALF set that identifies the selected ALF set. As one example, the processing circuitry may truncated binary encode the index into the list of ALF sets, and signal the truncated binary encoded index into the list of ALF sets.

The processing circuitry may perform adaptive loop filtering on the current block based on the determined ALF set (128). For example, where the processing circuitry is for video encoder 20, the processing circuitry may perform the adaptive loop filtering after a decoding loop in an encoding process.

The above example techniques are described with respect to determining an ALF set for a current block and performing the adaptive loop filtering for the current block based on the determined ALF set. Such example techniques cover examples where the ALF set is determined for an entire slice, tile, or picture that includes the current block. By determining the ALF set for the slice, tile, or picture that includes the current block, the processing circuitry may be considered as determining the ALF set for the current block. Also, the ALF sets stored in the buffer are described as ALF sets for previously coded blocks. The ALF sets may be for slice, tile, or picture that includes the previously coded blocks since the ALF sets were used to adaptive loop filter the previously coded blocks.

The following are some example techniques that may be performed together and/or in combination with any of the techniques described in this disclosure. The following examples are merely some examples and should not be considered limiting or necessary in all examples.

Example 1

A method of encoding video data, the method comprising determining a number of available adaptive loop filter (ALF) sets stored to a temporal buffer and signaling the number of available ALF sets in an encoded video bitstream.

Example 2

A method of decoding encoded video data, the method comprising receiving, in an encoded video bitstream, a number of available adaptive loop filter (ALF) sets, based on the received number of available ALF sets, retrieving one or more ALF sets from a temporal buffer, and reconstructing at least a portion of the encoded video data using the retrieved one or more ALF sets.

Example 3

The method of example 1 or example 2, wherein the available ALF sets are applicable to a current picture.

Example 4

The method of example 1 or example 2, wherein the available ALF sets are applicable to a current slice.

Example 5

The method of example 1 or example 2, wherein the available ALF sets are applicable to a current tile.

Example 6

The method of example 1, wherein signaling the number of available ALF sets in the encoded video bitstream comprises signaling the number of ALF sets using truncated binary coding.

Example 7

The method of example 2, wherein the number of available ALF sets received in the encoded video bitstream is signaled according to truncated binary coding.

Example 8

A method of decoding encoded video data, the method comprising receiving, in an encoded video bitstream, a syntax element identifying a particular buffer included in a plurality of buffers and populating the particular buffer with one or more predefined adaptive loop filter (ALF) sets.

Example 9

The method of example 8, wherein the syntax element is a one-bit flag.

Example 10

The method of either example 8 or example 9, wherein the particular buffer identified by the syntax element is a first buffer, the method further comprising identifying a second buffer that is different from the first buffer and populating the second buffer with one or more temporal filter sets.

Example 11

A method of decoding encoded video data, the method comprising receiving, in an encoded video bitstream, a syntax element indicating that a temporal filter set is to be used for reconstructing a portion of the encoded video data and receiving, in the encoded video bitstream, a temporal filter set index.

Example 12

The method of example 11, wherein the temporal filter set index is signaled in the encoded video bitstream according to non-truncated coding.

Example 13

The method of either example 11 or example 12, wherein the syntax element is a one-bit flag.

Example 14

A method of encoding video data, the method comprising signaling, in an encoded video bitstream, a syntax element indicating that a temporal filter set is to be used for reconstructing a portion of the encoded video bitstream and based on the syntax element indicating that the temporal filter set is to be used for reconstructing the portion of the encoded video bitstream, signaling, in the encoded video bitstream, a temporal filter set index.

Example 15

The method of example 14, wherein signaling the temporal filter set index in the encoded video bitstream comprises signaling the temporal filter set index according to non-truncated coding.

Example 16

The method of either example 14 or example 15, wherein the syntax element is a one-bit flag.

Example 17

A video coding device comprising a video data memory storing the video data and processing circuitry in communication with the video data memory, the processing circuitry being configured to perform the method of any of examples 1-16.

Example 18

The video coding device of example 17, wherein the video coding device comprises a video decoding device, and the processing circuitry comprises at least one of fixed-function or programmable circuitry comprising a video decoder.

Example 19

The video coding device of example 17, wherein the video coding device comprises a video encoding device, and the processing circuitry comprises at least one of fixed-function or programmable circuitry comprising a video encoder.

Example 20

The video encoding device of example 19, wherein the video encoding device is configured to perform video decoding.

Example 21

An apparatus comprising means to perform the method of any of examples 1-16.

Example 22

A computer-readable storage medium encoded with instructions that, when executed, cause a processor of a video coding device to perform the method of any of examples 1-16.

Example 23

Any combination of techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can be any of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of filtering video data, the method comprising:
   storing, in a buffer, adaptive loop filter (ALF) sets in a single 1-D array of size N, wherein each element in the single 1-D array stores a respective ALF set and a temporal layer identification value indicating a layer of the respective ALF set;
   determining available ALF sets from the ALF sets stored in the single 1-D array in the buffer that can be utilized for performing adaptive loop filtering on a current block of a current picture, wherein the ALF sets include ALF sets of previously coded blocks, and wherein the available ALF sets comprise ALF sets having a temporal layer identification value that is less than or equal to a temporal layer identification value of the current block;

receiving information indicative of a size of a list of ALF sets;

constructing the list of ALF sets from the determined available ALF sets based on the indicated size of the list of ALF sets;

determining an ALF set for the current block based on the constructed list of ALF sets; and performing adaptive loop filtering on the current block based on the determined ALF set.

2. The method of claim 1, wherein determining the ALF set for the current block comprises receiving an index into the list of ALF sets that identifies the ALF set.

3. The method of claim 2, wherein receiving the index into the list of ALF sets comprises receiving a truncated binary encoded index, the method further comprising decoding the truncated binary encoded index to generate a decoded index, wherein determining the ALF set comprises determining the ALF set based on the decoded index into the list of ALF sets that identifies the ALF set.

4. The method of claim 1, wherein constructing the list of ALF sets comprises retrieving the determined available ALF sets until the size of the list of the ALF sets is reached.

5. The method of claim 1, wherein performing the adaptive loop filtering comprises performing the adaptive loop filtering as part of a decoding process.

6. The method of claim 1, wherein the ALF sets of previously coded blocks include at least one of ALF sets of blocks in a picture other than the current picture or ALF sets of blocks in the current picture.

7. A device for filtering video data, the device comprising:
a buffer configured to store adaptive loop filter (ALF) sets of previously coded blocks; and
processing circuitry configured to:
store, in the buffer, the ALF sets in a single 1-D array of size N, wherein each element in the single 1-D array stores a respective ALF set and a temporal layer identification value indicating a layer of the respective ALF set;
determine available ALF sets from the ALF sets stored in the single 1-D array in the buffer that can be utilized for performing adaptive loop filtering on the current block of the current picture, wherein the available ALF sets comprise ALF sets having a temporal layer identification value that is less than or equal to a temporal layer identification value of the current block;
receive information indicative of a size of a list of ALF sets;
construct the list of ALF sets from the determined available ALF sets based on the indicated size of the list of ALF sets;
determine an ALF set for the current block based on the constructed list of ALF sets; and
perform adaptive loop filtering on the current block based on the determined ALF set.

8. The device of claim 7, wherein to determine the ALF set for the current block, the processing circuitry is configured to receive an index into the list of ALF sets that identifies the ALF set.

9. The device of claim 8, wherein to receive the index into the list of ALF sets, the processing circuitry is configured to receive a truncated binary encoded index, wherein the processing circuitry is configured to decode the truncated binary encoded index to generate a decoded index, and wherein to determine the ALF set, and the processing circuitry is configured to determine the ALF set based on the decoded index into the list of ALF sets that identifies the ALF set.

10. The device of claim 7, wherein to construct the list of ALF sets, the processing circuitry is configured to retrieve the determined available ALF sets until the size of the list of the ALF sets is reached.

11. The device of claim 7, wherein the processing circuitry is a video decoder, and wherein to perform the adaptive loop filtering, the video decoder is configured to perform the adaptive loop filtering as part of a decoding process.

12. The device of claim 7, wherein the ALF sets of previously coded blocks include at least one of ALF sets of blocks in a picture other than the current picture or ALF sets of blocks in the current picture.

13. The device of claim 7, wherein the device comprises a wireless communication device.

14. A method of filtering video data, the method comprising:
storing, in a buffer, adaptive loop filter (ALF) sets in a single 1-D array of size N, wherein each element in the single 1-D array stores a respective ALF set and a temporal layer identification value indicating a layer of the respective ALF set;
determining available ALF sets from the ALF sets stored in the single 1-D array in the buffer that can be utilized for performing adaptive loop filtering on a current block of a current picture, wherein the ALF sets include ALF sets of previously coded blocks, and wherein the available ALF sets comprise ALF sets having a temporal layer identification value that is less than or equal to a temporal layer identification value of the current block;
signaling information indicative of a size of a list of ALF sets;
constructing the list of ALF sets from the determined available ALF sets based on the indicated size of the list of ALF sets;
determining an ALF set for the current block based on the constructed list of ALF sets; and
performing adaptive loop filtering on the current block based on the determined ALF set.

15. The method of claim 14, further comprising:
signaling an index into the list of ALF sets that identifies the determined ALF set.

16. The method of claim 15, further comprising:
truncated binary encoding the index into the list of ALF sets,
wherein signaling the index into the list of ALF sets comprises signaling the truncated binary encoded index into the list of ALF sets.

17. The method of claim 14, wherein constructing the list of ALF sets comprises retrieving the determined available ALF sets until the size of the list of the ALF sets is reached.

18. The method of claim 14, wherein performing the adaptive loop filtering comprises performing the adaptive loop filtering after a decoding loop in an encoding process.

19. The method of claim 14, wherein the ALF sets of previously coded blocks include at least one of ALF sets of blocks in a picture other than the current picture or ALF sets of blocks in the current picture.

20. A device for filtering video data, the device comprising:
a buffer configured to store adaptive loop filter (ALF) sets of previously coded blocks; and
processing circuitry configured to:
store, in the buffer, the ALF sets in a single 1-D array of size N, wherein each element in the single 1-D array stores a respective ALF set and a temporal layer identification value indicating a layer of the respective ALF set;
determine available ALF sets from the ALF sets stored in the single 1-D array in the buffer that can be utilized for performing adaptive loop filtering on the current block of the current picture, wherein the available ALF sets comprise ALF sets having a temporal layer identification value that is less than or equal to a temporal layer identification value of the current block;
signal information indicative of a size of a list of ALF sets;
construct the list of ALF sets from the determined available ALF sets based on the indicated size of the list of ALF sets;
determine an ALF set for the current block based on the constructed list of ALF sets; and
perform adaptive loop filtering on the current block based on the determined ALF set.

21. The device of claim 20, wherein the processing circuitry is configured to:
signal an index into the list of ALF sets that identifies the determined ALF set.

22. The device of claim 21, wherein the processing circuitry is configured to:
truncated binary encode the index into the list of ALF sets, wherein to signal the index into the list of ALF sets, the processing circuitry is configured to signal the truncated binary encoded index into the list of ALF sets.

23. The device of claim 20, wherein to construct the list of ALF sets, the processing circuitry is configured to retrieve the determined available ALF sets until the size of the list of the ALF sets is reached.

24. The device of claim 20, wherein the processing circuitry is a video encoder, and wherein to perform the adaptive loop filtering, the video encoder is configured to perform the adaptive loop filtering after a decoding loop in an encoding process.

25. The device of claim 20, wherein the ALF sets of previously coded blocks include at least one of ALF sets of blocks in a picture other than the current picture or ALF sets of blocks in the current picture.

26. The device of claim 20, wherein the device comprises a wireless communication device.

* * * * *